(12) United States Patent
Tanimoto

(10) Patent No.: US 11,829,958 B2
(45) Date of Patent: Nov. 28, 2023

(54) MAINTENANCE METHOD, MAINTENANCE SERVER, AND A NON-TRANSITORY COMPUTER READABLE MEDIUM

(71) Applicant: MURATA MACHINERY, LTD., Kyoto (JP)

(72) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 151 days.

(21) Appl. No.: 17/599,613

(22) PCT Filed: Mar. 4, 2020

(86) PCT No.: PCT/JP2020/009045
§ 371 (c)(1),
(2) Date: Sep. 29, 2021

(87) PCT Pub. No.: WO2020/202993
PCT Pub. Date: Oct. 8, 2020

(65) Prior Publication Data
US 2022/0164777 A1 May 26, 2022

(30) Foreign Application Priority Data
Apr. 5, 2019 (JP) ................................ 2019-072891

(51) Int. Cl.
*G06Q 10/20* (2023.01)
*G06F 3/0481* (2022.01)
(Continued)

(52) U.S. Cl.
CPC .......... *G06Q 10/20* (2013.01); *G06F 3/0481* (2013.01); *G06F 3/04842* (2013.01); *G06F 3/14* (2013.01); *G06T 11/00* (2013.01); *H04L 51/224* (2022.05)

(58) Field of Classification Search
None
See application file for complete search history.

(56) References Cited

U.S. PATENT DOCUMENTS

| 5,880,716 A | 3/1999 | Kunugi |
| 10,838,211 B2 | 11/2020 | Nishi |

(Continued)

FOREIGN PATENT DOCUMENTS

| JP | 2002-032880 A | 1/2002 |
| JP | 2011-055455 A | 3/2011 |

(Continued)

OTHER PUBLICATIONS

Official Communication issued in International Patent Application No. PCT/JP2020/009045, dated Jun. 23, 2020.

(Continued)

*Primary Examiner* — Toan H Vu
(74) *Attorney, Agent, or Firm* — KEATING & BENNETT, LLP

(57) ABSTRACT

A method for maintaining a facility in an automatic warehouse system by using a maintenance terminal at a maintenance base includes generating a workplace image showing the automatic warehouse system, acquiring access information, generating a composite image by associating an object in the workplace image with the access information to access the corresponding facility, outputting the composite image to the maintenance terminal, receiving a selection of the object, and establishing a communication session between the corresponding facility and the maintenance terminal by using the access information associated to the selected object.

13 Claims, 31 Drawing Sheets

(51) Int. Cl.
  *G06F 3/04842* (2022.01)
  *G06F 3/14* (2006.01)
  *G06T 11/00* (2006.01)
  *H04L 51/224* (2022.01)

(56) References Cited

U.S. PATENT DOCUMENTS

| | | | |
|---|---|---|---|
| 11,457,730 B1* | 10/2022 | Eidam | H04W 4/026 |
| 2002/0062159 A1 | 5/2002 | Draghetti et al. | |
| 2008/0063001 A1 | 3/2008 | Tanimoto | |
| 2012/0102205 A1 | 4/2012 | Tanimoto | |
| 2012/0259436 A1 | 10/2012 | Resurreccion et al. | |
| 2016/0291577 A1 | 10/2016 | Yatabe et al. | |
| 2018/0275940 A1* | 9/2018 | Kumar | G06F 3/011 |
| 2019/0121522 A1* | 4/2019 | Davis | G06V 40/28 |
| 2019/0138168 A1* | 5/2019 | Vickers | G06F 3/04845 |
| 2019/0180245 A1* | 6/2019 | Weindling | G06Q 10/105 |
| 2019/0318186 A1* | 10/2019 | Sergott | G06Q 10/063114 |
| 2019/0318541 A1* | 10/2019 | Sergott | G06T 11/00 |
| 2020/0320792 A1* | 10/2020 | Sadalgi | G06F 3/04845 |
| 2020/0364257 A1* | 11/2020 | Levin | H04N 1/00461 |
| 2021/0216135 A1* | 7/2021 | Connellan | G01C 21/1652 |
| 2021/0333864 A1* | 10/2021 | Harvey | G06T 19/006 |
| 2022/0083978 A1* | 3/2022 | Weindling | G06Q 10/105 |

FOREIGN PATENT DOCUMENTS

| | | |
|---|---|---|
| JP | 5254909 B2 | 8/2013 |
| JP | 2013-183447 A | 9/2013 |
| JP | 2016-201007 A | 12/2016 |

OTHER PUBLICATIONS

Official Communication issued in International Patent Application No. PCT/JP2020/009045, dated Oct. 14, 2021.

Official Communication issued in corresponding European Patent Application No. 20783934.1, dated Nov. 7, 2022.

* cited by examiner

| IDENTIFICATION NUMBER | USER ID |
|---|---|
| 101 | vpn001 |
| 201 | vpn002 |
| 102 | vpn003 |
| 103 | vpn004 |
| 202 | vpn005 |

| | R1 | R3 | R4 | R5 | |
|---|---|---|---|---|---|
| IP ADDRESS (R2) | FACILITY NAME | SUB-ID | SUB-TYPE | STATE | |
| 192.168.0.1 | CRANE #1 CAMERA | cam001 | CAMERA | OK | AC |
| 192.168.0.2 | CRANE #2 CAMERA | cam002 | CAMERA | OK | AC |
| 192.168.0.3 | CONVEYOR #1 CAMERA | cam003 | CAMERA | NG | AC |
| 192.168.0.4 | CONVEYOR #2 CAMERA | cam004 | CAMERA | NG | AC |
| 192.168.0.11 | CRANE #1 SENSOR | sen001 | SENSOR | OK | AC |
| 192.168.0.21 | EXTERNAL STORAGE DEVICE #1 | | | OK | AC |
| 192.168.0.22 | EXTERNAL STORAGE DEVICE #2 | | | OK | AC |
| 192.168.0.31 | INFORMATION MANAGEMENT SERVER | | | OK | AC |
| 192.168.0.32 | CONVEYANCE MANAGEMENT SERVER | | | OK | AC |
| 192.168.0.111 | CRANE #1 CONTROL PANEL | ctrl001 | CONTROLLER | OK | AC |
| 192.168.0.112 | CRANE #2 CONTROL PANEL | ctrl002 | CONTROLLER | OK | AC |
| 192.168.0.41 | CONVEYOR #1 PLC | PLC001 | PLC | OK | AC |
| 192.168.0.42 | CONVEYOR #2 PLC | PLC002 | PLC | OK | AC |

| IP ADDRESS | FACILITY NAME | SUB-ID | SUB-TYPE | STATE |
|---|---|---|---|---|
| 172.28.0.2 | MAINTENANCE TERMINAL #1 | | | |
| 172.28.0.3 | MAINTENANCE TERMINAL #2 | | | |

MAINTENANCE METHOD, MAINTENANCE SERVER, AND A NON-TRANSITORY COMPUTER READABLE MEDIUM

BACKGROUND OF THE INVENTION

1. Field of the Invention

The present invention relates to a maintenance method for maintaining a facility at a workplace, a maintenance server that is used for the maintaining work, and a non-transitory computer readable medium including a program that causes a computer to execute the maintenance method.

2. Description of the Related Art

Conventionally, there is known a technique for accessing a server or a terminal in a LAN and a terminal outside the LAN, via a virtual private network (VPN) (e.g., see Japanese Patent No. 5254909). In the system of Japanese Patent No. 5254909, when an external terminal accesses to a server or a terminal in a specific LAN via a VPN, information for connecting to a gateway of the VPN is sent to the external terminal from a server that manages the information. This information for connecting to the gateway includes an address of the gateway.

SUMMARY OF THE INVENTION

The above-mentioned technique of VPN connection between the external terminal and the terminal or the like in the specific LAN is considered to apply to a workplace such as an automatic warehouse equipped with many facilities. In this way, the external terminal is able to access to the facilities in the workplace via the network.

However, the conventional VPN connection technique is not intended to be used in a situation such as the workplace equipped with many facilities. For instance, in the conventional VPN connection, access information (address) to the gateway of the VPN connection is provided, but information about an arrangement of the terminal and the server in the LAN is not provided.

In a workplace equipped with many facilities, a target facility may be identified based on its location in the workplace, but if information about the arrangement of the facilities is not provided as in the conventional VPN connection, it may be difficult to quickly obtain access to a target facility from the external terminal.

Preferred embodiments of the present invention provide easy and quick access to a facility from an external terminal, in a system for a terminal outside a workplace to access to a facility in the workplace.

A plurality of aspects of preferred embodiments of the present invention are described below. These aspects can be arbitrarily combined as necessary.

A maintenance method according to one aspect of a preferred embodiment of the present invention is a method executed by a maintenance server to maintain a facility at a workplace using a maintenance terminal installed at a maintenance base outside the workplace. The maintenance method includes generating a workplace image showing the workplace, acquiring access information to access to the facility, generating a composite image by associating an object indicating the facility in the workplace image with the access information to access to the facility, outputting the composite image to the maintenance terminal, receiving a selection of the object in the composite image using the maintenance terminal, and establishing a communication session between the facility corresponding to the selected object and the maintenance terminal, by using the access information associated with the selected object.

In the above-mentioned maintenance method for maintaining a facility at a workplace using an external maintenance terminal, the composite image is generated, which includes the object indicating arrangement and shape of the facility at the workplace. The generated composite image is outputted to the external maintenance terminal.

In addition, the object in the composite image is associated with access information to access to the corresponding facility. When the maintenance terminal selects a specific object in the composite image, a communication session between the facility corresponding to the object and the maintenance terminal is established using the access information associated with the selected object.

In this way, a user of the maintenance terminal can easily identify the facility to be accessed by referring to the composite image, and can quickly access to the specified facility.

A plurality of the workplaces may exist. In this case, the workplace image, the access information, and the composite image are generated for each of the plurality of workplaces.

In this way, the user of the maintenance terminal can easily identify the facility existing at the plurality of workplaces, and can quickly access to the specified facility.

The maintenance method may further include receiving abnormality information indicating an abnormality that occurs in the facility, from the facility, and generating the composite image by associating the abnormality information with the object corresponding to the facility in which the abnormality occurs.

In this way, the user of the maintenance terminal can easily and quickly access to information about the abnormality that occurs in the facility.

The maintenance method may further include generating a new composite image using new access information corresponding to a change in the facility, if the facility at the workplace is changed after the composite image is generated, and outputting the new composite image to the maintenance terminal.

In this way, when the facility is changed at the workplace, a latest composite image including a reflection of the change can be provided to the maintenance terminal.

The maintenance method may further include notifying the maintenance terminal that the composite image is updated when the new composite image is generated.

In this way, together with the update of the composite image, it is possible to notify the user of the maintenance terminal that the facility is changed at the workplace.

The maintenance method may further include displaying a chat box together with the composite image. The chat box provides a chat function between a maintenance person who uses the maintenance terminal and an operator who uses an operator terminal installed at the workplace. In this case, the notification that the composite image is updated is displayed in the chat box.

In this way, together with the update of the composite image, it is possible to notify also the operator at the workplace that the facility is changed at the workplace.

A maintenance server according to another aspect of a preferred embodiment of the present invention is a server to maintain a facility at a workplace by using a maintenance terminal installed at a maintenance base outside the workplace. The maintenance server includes a controller.

The controller is configured or programmed to generate a workplace image showing the workplace, acquire access information to access to the facility, generate a composite image by associating an object indicating the facility in the workplace image with the access information to access to the facility, output the composite image to the maintenance terminal, receive a selection of the object in the composite image using the maintenance terminal, and establish a communication session between the facility corresponding to the selected object and the maintenance terminal, by using the access information associated with the selected object.

In the maintenance server, the composite image is generated, which includes the object indicating arrangement and shape of the facility at the workplace. The generated composite image is outputted to the external maintenance terminal.

In addition, the object in the composite image is associated with the access information to access to the corresponding facility. When the maintenance terminal selects a specific object in the composite image, a communication session is established between the facility corresponding to the object and the maintenance terminal, by using the access information associated with the selected object.

In this way, the user of the maintenance terminal can easily identify the facility to be accessed by referring to the composite image, and can quickly access to the specified facility.

A plurality of workplaces may exist. In this case, the controller is configured or programmed to generate the workplace image, the access information, and the composite image for each of the plurality of workplaces.

In this way, the user of the maintenance terminal can easily identify the facility existing at the plurality of workplaces, and can quickly access to the specified facility.

The controller may be configured or programmed to receive abnormality information indicating an abnormality that occurs in the facility, from the facility, and may generate the composite image by associating the abnormality information with the object corresponding to the facility in which the abnormality is generated.

In this way, the user of the maintenance terminal can easily and quickly access to information about the abnormality generated in the facility.

If the facility at the workplace is changed after the composite image is generated, the controller may be configured or programmed to generate a new composite image using new access information corresponding to the change in the facility, and may output the new composite image to the maintenance terminal.

In this way, if the facility is changed at the workplace, a latest composite image with reflection of the change can be provided to the maintenance terminal.

When generating the new composite image, the controller may be configured or programmed to notify the maintenance terminal that the composite image is updated.

In this way, together with the update of the composite image, it is possible to notify the user of the maintenance terminal that the facility is changed at the workplace.

The controller may be configured or programmed to display a chat box together with the composite image. The chat box provides a chat function between a maintenance person who uses the maintenance terminal and an operator who uses an operator terminal installed at the workplace. In this case, the controller is configured or programmed to display in the chat box the notification that the composite image is updated.

In this way, together with the update of the composite image, it is possible to notify also the operator at the workplace that the facility is changed at the workplace.

A program according to still another aspect of a preferred embodiment of the present invention is a non-transitory computer readable medium including a program that causes a computer to execute the maintenance method described above.

By generating the composite image described above and outputting the same to the external maintenance terminal, the external maintenance terminal can easily identify the facility to be accessed by referring to the composite image, and can quickly access to the specified facility.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10A is a diagram illustrating an example of a gateway list.

FIG. 11A is a diagram illustrating an example of a data structure of a first facility list.

FIG. 11B is a diagram illustrating an example of a data structure of a second facility list.

FIG. 25 is a diagram illustrating an example of an initial screen.

DETAILED DESCRIPTION OF THE PREFERRED EMBODIMENTS

First Preferred Embodiment

Hereinafter, a maintenance server according to a preferred embodiment of the present invention is described. The maintenance server is a server to maintain a facility located at a workplace, by using a maintenance terminal installed at a maintenance base at a location apart from the workplace. Therefore, the maintenance server is installed in a communication system including the facility and a terminal at the workplace, and a terminal at the maintenance base.

Figure 1:
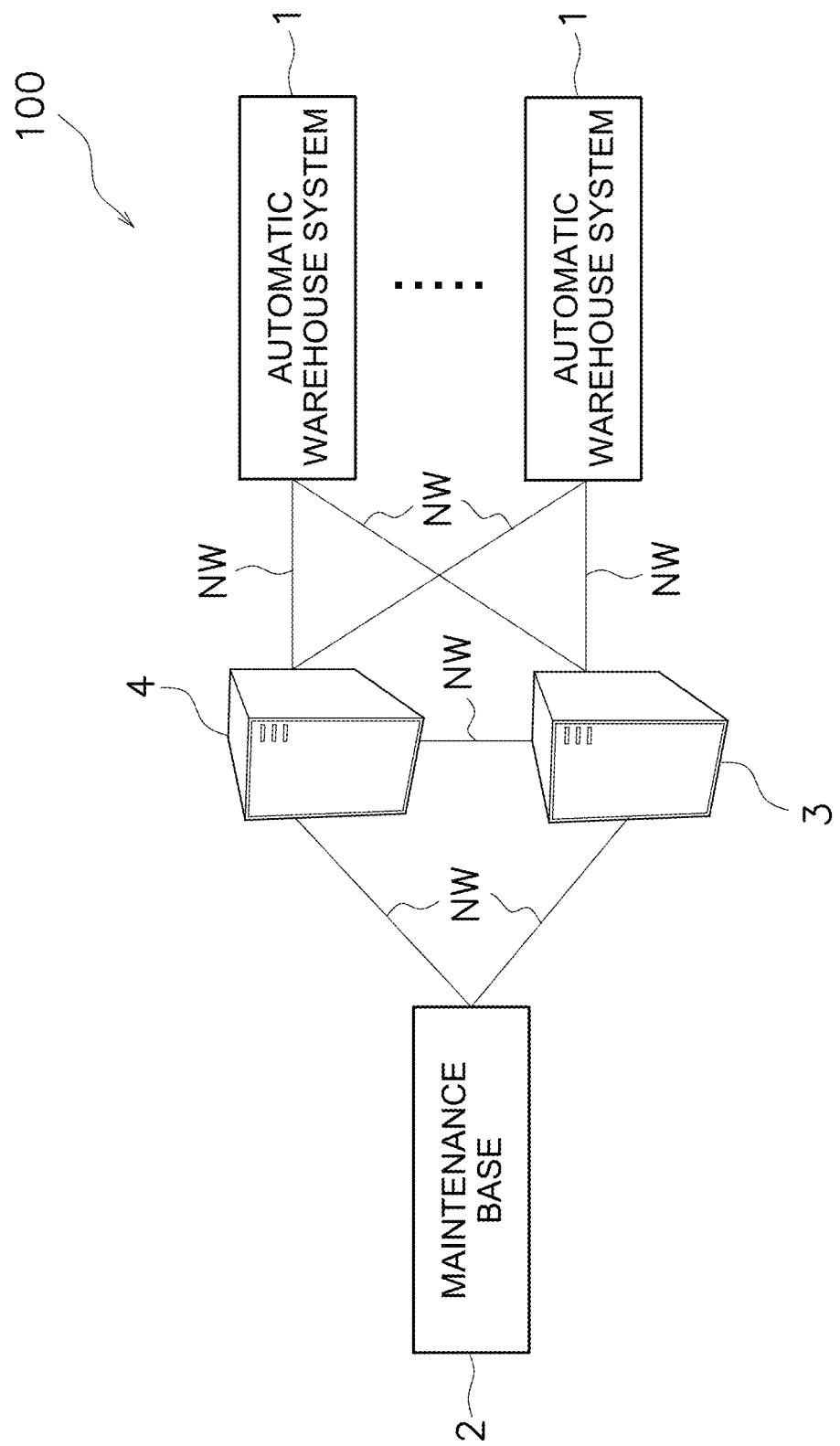
FIG. 1 is a diagram illustrating an example of an overall structure of a communication system.

With reference to FIG. 1, a communication system 100 according to the first preferred embodiment is described as an example of the communication system described above, hereinafter. FIG. 1 is a diagram illustrating an example of an overall structure of the communication system.

The communication system 100 according to the first preferred embodiment includes an automatic warehouse system 1 as an example of the workplace, a maintenance base 2, a maintenance server 3, and a relay server 4.

The automatic warehouse system 1 is a system located at a distribution center, for example, so as to perform loading and unloading of goods. The automatic warehouse system 1 includes an automatic warehouse 11 (an example of the facility) (FIG. 2) to perform loading and unloading of goods. The communication system 100 of this preferred embodiment includes a plurality of automatic warehouse systems 1.

The maintenance base 2 is, for example, a base where a maintenance person resides who performs maintenance and the like of the automatic warehouse 11 in the automatic warehouse system 1, and it is equipped with a terminal (maintenance terminal 21a, 21b) to maintain the automatic warehouse system 1. The maintenance terminal 21a, 21b at the maintenance base 2 can access to each facility in the plurality of automatic warehouse systems 1.

The maintenance server 3 is connected to the automatic warehouse system 1 and (a gateway of) the maintenance base 2 via a network NW (e.g. a WAN or the like). The maintenance server 3 stores a database that stores information about (facilities of) the automatic warehouse 11 (called operation information) stored at the automatic warehouse system 1, and information used to maintain the facilities managed at the maintenance base 2 (called maintenance information).

In addition, the maintenance server 3 provides the stored operation information and/or maintenance information to an operator terminal used by an operator who uses the automatic warehouse 11 in the automatic warehouse system 1, and to the maintenance terminal 21a, 21b used by the maintenance person at the maintenance base 2. In this way, in the communication system 100, the operation information and the maintenance information can be shared between the operator terminal and the maintenance terminal 21a, 21b via the maintenance server 3.

Further, when the maintenance server 3 maintains the facility in the automatic warehouse system 1 by using the maintenance terminal 21a, 21b, it intermediates to establish a communication session between the facility and the maintenance terminal 21a, 21b. The way of the intermediation will be described later in detail.

The relay server 4 is connected to the automatic warehouse system 1 and (the gateway device of) the maintenance base 2 via the network NW. The relay server 4 is a server to relay communication between the automatic warehouse system 1 and the maintenance base 2.

In addition, the relay server 4 is connected to the maintenance server 3 via the network NW, and provides various information stored in the relay server 4 to the maintenance server 3 in response to a request from the maintenance server 3.

It should be noted that, in the communication system 100 according to this preferred embodiment, transmission and reception of a command or the like between the maintenance server 3 and each device described later (such as a gateway device, or a camera or a sensor in the automatic warehouse system 1) is performed using a WebSocket protocol, for example.

In addition, in the communication system 100 illustrated in FIG. 1, there is only one maintenance base 2, but this is not a limitation. There may be a plurality of maintenance bases 2 in the communication system 100. For instance, it may be possible not only to enable the single maintenance base 2 to maintain a plurality of automatic warehouse systems 1 but also to enable the single automatic warehouse system 1 to be maintained by a plurality of maintenance bases 2.

Figure 2:
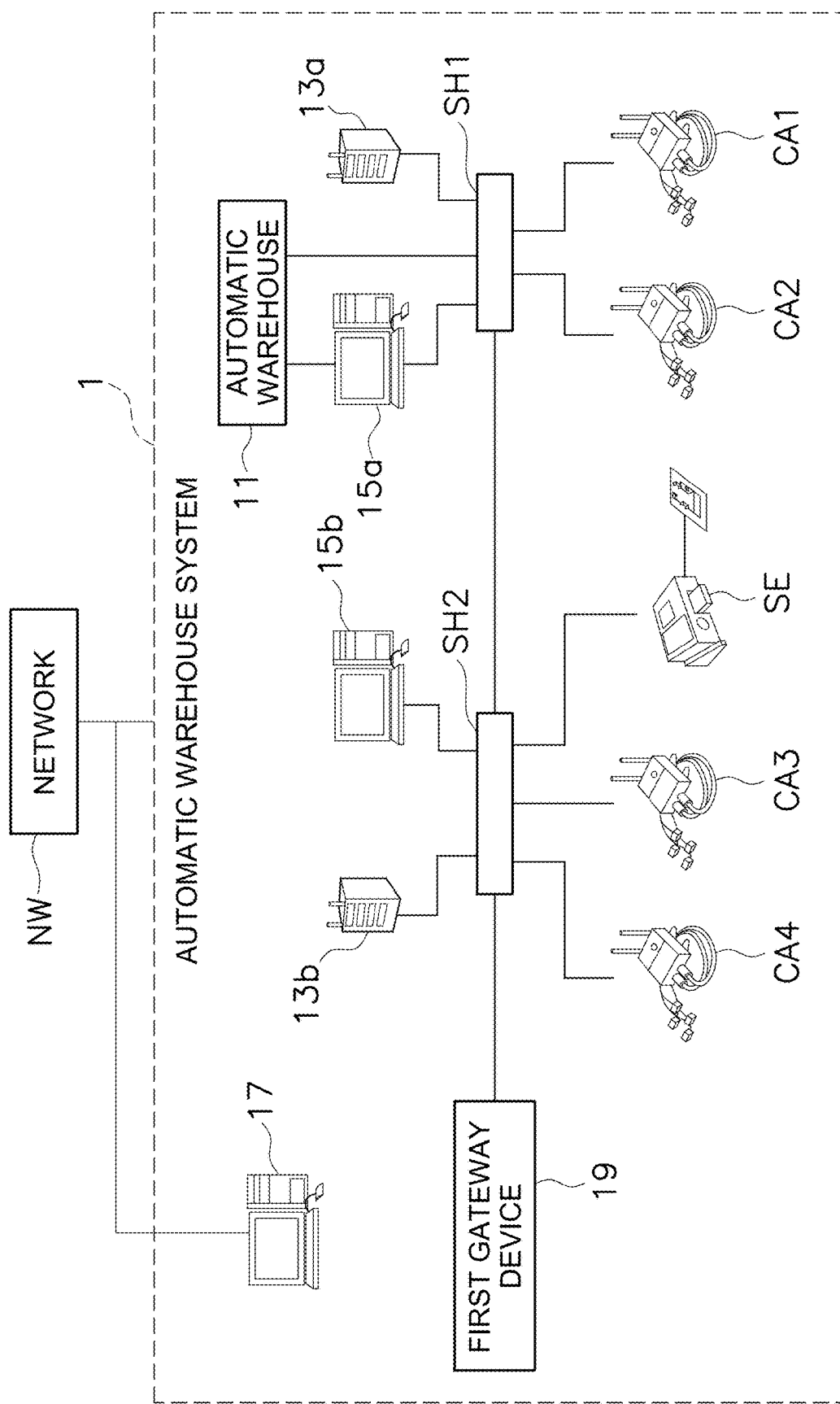
FIG. 2 is a diagram illustrating an example of a structure of an automatic warehouse system.

Hereinafter, with reference to FIG. 2, a detailed structure of the automatic warehouse system 1 included in the communication system 100 is described. FIG. 2 is a diagram illustrating an example of a structure of the automatic warehouse system. It should be noted that the plurality of automatic warehouse systems 1 have the same basic structure though the number of facilities is different between them. Therefore, in the following description, a basic structure of the typical automatic warehouse system 1 is described.

The automatic warehouse system 1 includes the automatic warehouse 11. The automatic warehouse 11 includes a rack, a stacker crane, a conveyor, and the like, so as to perform loading, unloading, transfer, storage, and the like of goods.

Figure 3:
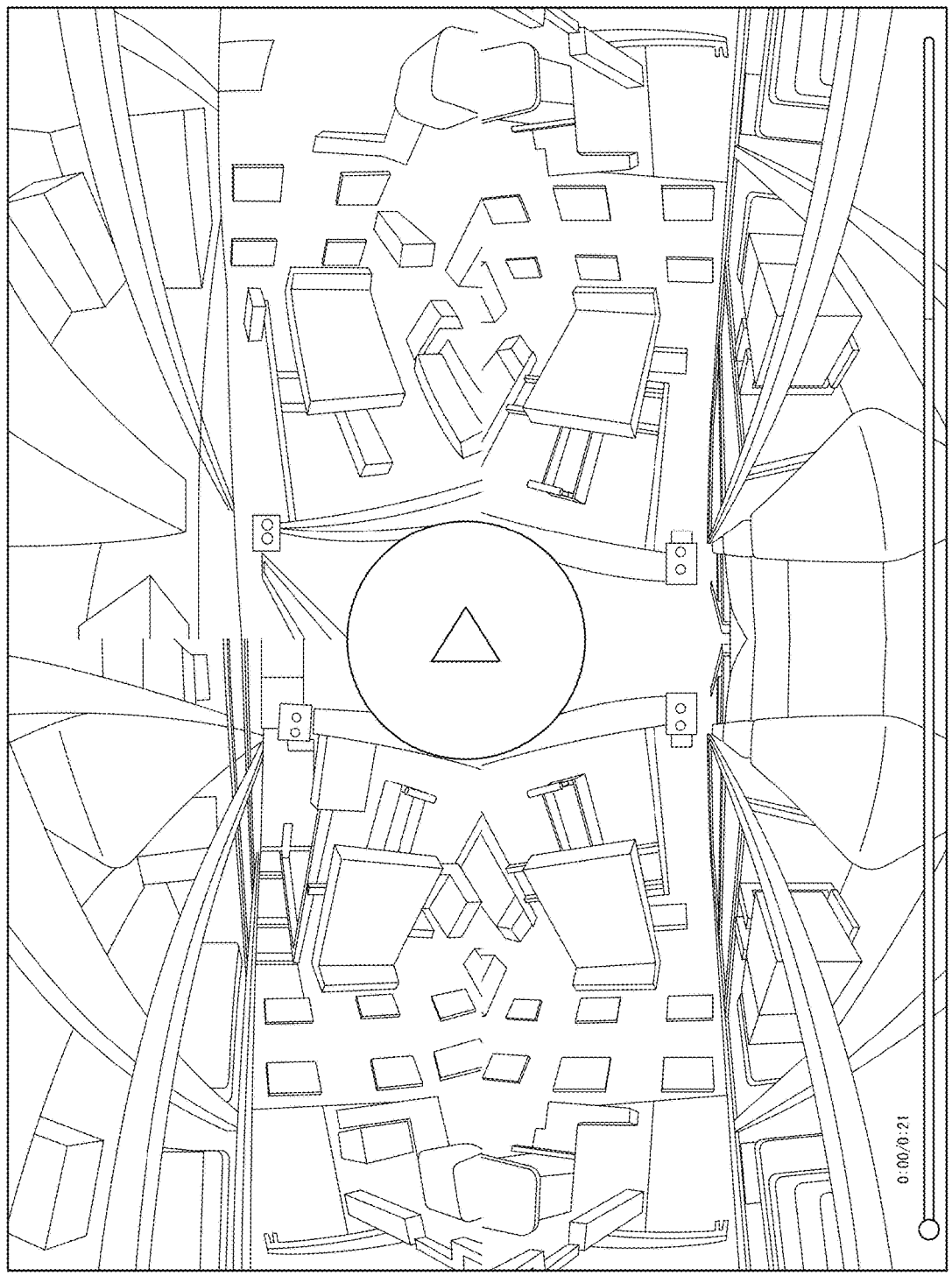
FIG. 3 is a diagram illustrating an example of image data.

In this preferred embodiment, the stacker crane and the conveyor of the automatic warehouse 11 are equipped with cameras CA1 to CA4 that are configured to take still images and movies of a predetermined time length, for example, and visual operation information FI indicating statuses of the stacker crane and the conveyor can be acquired. The camera CA1 to CA4 is a fish-eye lens camera, for example. Using the camera CA1 to CA4, the operation information FI can be obtained that is the image data (movie) as illustrated in FIG. 3, for example. FIG. 3 is a diagram illustrating an example of the image data.

Figure 4:
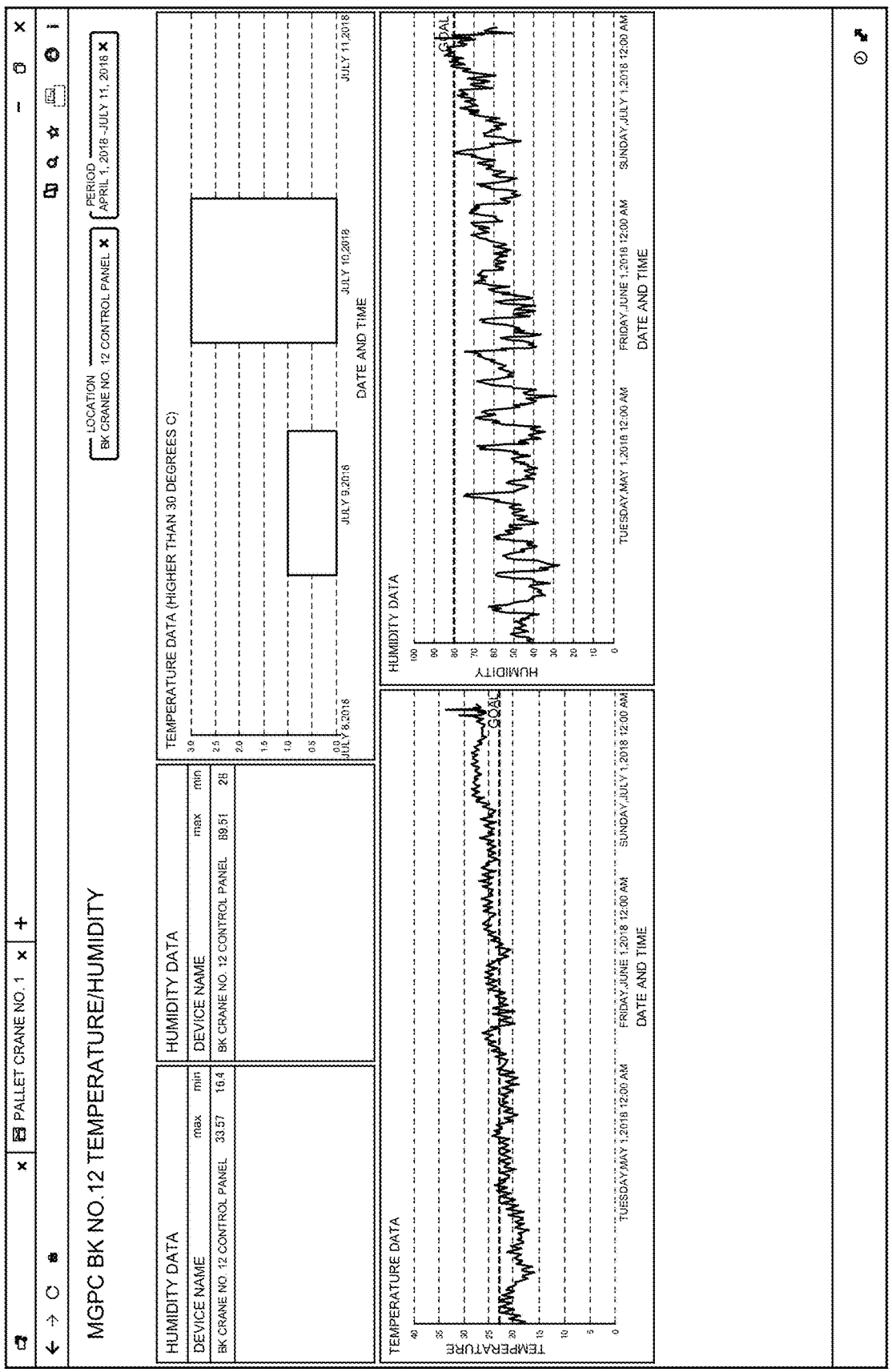
FIG. 4 is a diagram illustrating an example of measurement data using a sensor.

In addition, a sensor SE (e.g., a temperature and humidity sensor) that is configured to measure ambient temperature and humidity is disposed in a vicinity of the automatic warehouse 11, and ambient temperature and humidity can be acquired as the operation information FI. Using the sensor SE, the measurement data (operation information FI) that is data displayed as a line graph or a bar graph of the measured temperature and humidity as illustrated in FIG. 4, can be obtained, for example. FIG. 4 is a diagram illustrating an example of the measurement data using the sensor.

Further, the stacker crane is equipped with a sensor SE to measure a predetermined physical quantity, and the operation information FI can be measured that is a level of vibration and/or sound generated due to a load shift or the like when the load shift or the like occurs in the stacker crane. As such sensor SE, an acceleration sensor, a sound sensor, or the like can be used, for example.

It should be noted that four cameras CA1 to CA4 and one sensor SE are installed in the automatic warehouse system 1 illustrated in FIG. 2, for example, but the numbers of the cameras and the sensors installed in the automatic warehouse 11 are not limited to those described above, but can be any numbers in accordance with a size or the like of the automatic warehouse system 1.

With reference to FIG. 2, the network structure in which individual facilities can communicate with each other in the automatic warehouse system 1 is further described.

The network structure of the automatic warehouse system 1 includes a first switching hub SH1. The first switching hub SH1 is connected with the cameras CA1 and CA2 and a first external storage device 13a as illustrated in FIG. 2. The first external storage device 13a is a network attached storage (NAS) device which stores the image data acquired by the camera CA1, CA2, for example.

In addition, control devices of the stacker crane, the conveyor, and etc. (not shown in the figure) are connected to the first switching hub SH1.

The network structure of the automatic warehouse system 1 includes a second switching hub SH2. The second switching hub SH2 is connected with the cameras CA3 and CA4, the sensor SE, and a second external storage device 13b. The second external storage device 13b is a NAS device, for example, and stores image data acquired by the camera CA3, CA4, and measurement data acquired by the sensor SE.

The second switching hub SH2 is connected also with the first switching hub SH1, and the image data acquired by the camera CA1, CA2 can be stored also in the second external storage device 13b, while the image data acquired by the camera CA3, CA4, and the date acquired by the sensor SE can be stored also in the first external storage device 13a.

The network structure of the automatic warehouse system 1 includes a server that is configured to manage the automatic warehouse system 1. Specifically, it includes a conveyance management server 15a and an information management server 15b.

The conveyance management server 15a is a computer system including a CPU, a storage device (such as a RAM, a ROM, an SSD, a hard disk, or the like), and various interfaces such as a network interface. The conveyance management server 15a can communicate with the stacker crane, the conveyor, and the like in the automatic warehouse 11, and controls the stacker crane and the conveyor to control and manage loading and unloading of goods in the automatic warehouse 11.

It should be noted that, in this preferred embodiment, the conveyance management server 15a is connected with the first switching hub SH1.

The information management server 15b is a computer system including a CPU, a storage device (such as a RAM, a ROM, an SSD, a hard disk, or the like), and various interfaces such as a network interface. The information management server 15b manages various data (such as data acquired by the cameras CA1 to CA4 and the sensor SE) stored in the first external storage device 13a and the second external storage device 13b. The information management server 15b acquires the information managed by the conveyance management server 15a, as necessary.

It should be noted that, in this preferred embodiment, the information management server 15b is connected to the second switching hub SH2.

The network structure of the automatic warehouse system 1 includes an operator terminal 17. The operator terminal 17 is a personal computer, a tablet terminal, or the like, for example. The operator terminal 17 is a terminal used by an operator who works in the automatic warehouse 11, and can communicate with the maintenance server 3 via the network NW. In this way, the operator can access to the operation information FI and maintenance information MI stored in the maintenance server 3, by using the operator terminal 17. In the case where the operator terminal 17 is a tablet terminal, the operator can perform a maintenance of the device, with taking the operator terminal 17 to an installation location of the device to be maintained (the automatic warehouse, the camera, or the sensor). In addition, also in the case where the operator terminal 17 is a terminal (such as a personal computer) other than a tablet terminal, the operator terminal 17 may access to the camera CA1 to CA4, the sensor SE, or the like.

It should be noted that only one operator terminal 17 is installed in the automatic warehouse system 1 illustrated in FIG. 2, but this is not a limitation. A plurality of the operator terminals 17 may be installed.

The network structure of the automatic warehouse system 1 includes a first gateway device 19. The first gateway device 19 is a computer system including a CPU, a storage device (such as a RAM, a ROM, an SSD, a hard disk, or the like), and various interfaces such as a network interface. In addition, the first gateway device 19 may be hardware performing a portion or an entirety of its functions using an SoC or the like.

The first gateway device 19 is connected to the second switching hub SH2 and an external network NW, to relay communication between the external and each facility in the network structure of the automatic warehouse system 1. Therefore, the first gateway device 19 stores a first facility list EL1 (described later), which is a list of information about facilities connected to the first gateway device 19, in the storage device.

When the first gateway device 19 receives an instruction to establish a communication session between the maintenance terminal 21a, 21b and each facility in the automatic warehouse system 1 (such as the control device or the like of the cameras CA1 to CA4, the sensor SE, the stacker crane, or the conveyor) from the relay server 4, it performs the establishment of a VPN session with a second gateway device 23 (described later) at the maintenance base 2.

In addition, the first gateway device 19 has a function to upload to the maintenance server 3 the operation information FI at a predetermined timing, which is the image data of the camera CA1 to CA4, the measurement data of the sensor SE, abnormality information indicating an abnormality generated in each facility, or the like, stored in the first external storage device 13a or the second external storage device 13b. Other than that, the first gateway device 19 can upload to the maintenance server 3 the operation information FI, which is information about maintenance of each facility, the operation information of each facility, a picture of a facility taken by the operator or the like, information about order placement of a component of each facility, or the like.

It can be appropriately determined that the above-mentioned predetermined timing is every constant time period (e.g. every one hour, every day, or the like), a timing at which the new operation information FI is stored, a timing at which existing operation information FI is updated, a timing at which stored operation information FI becomes a certain size, or the like, for example.

Figure 5:
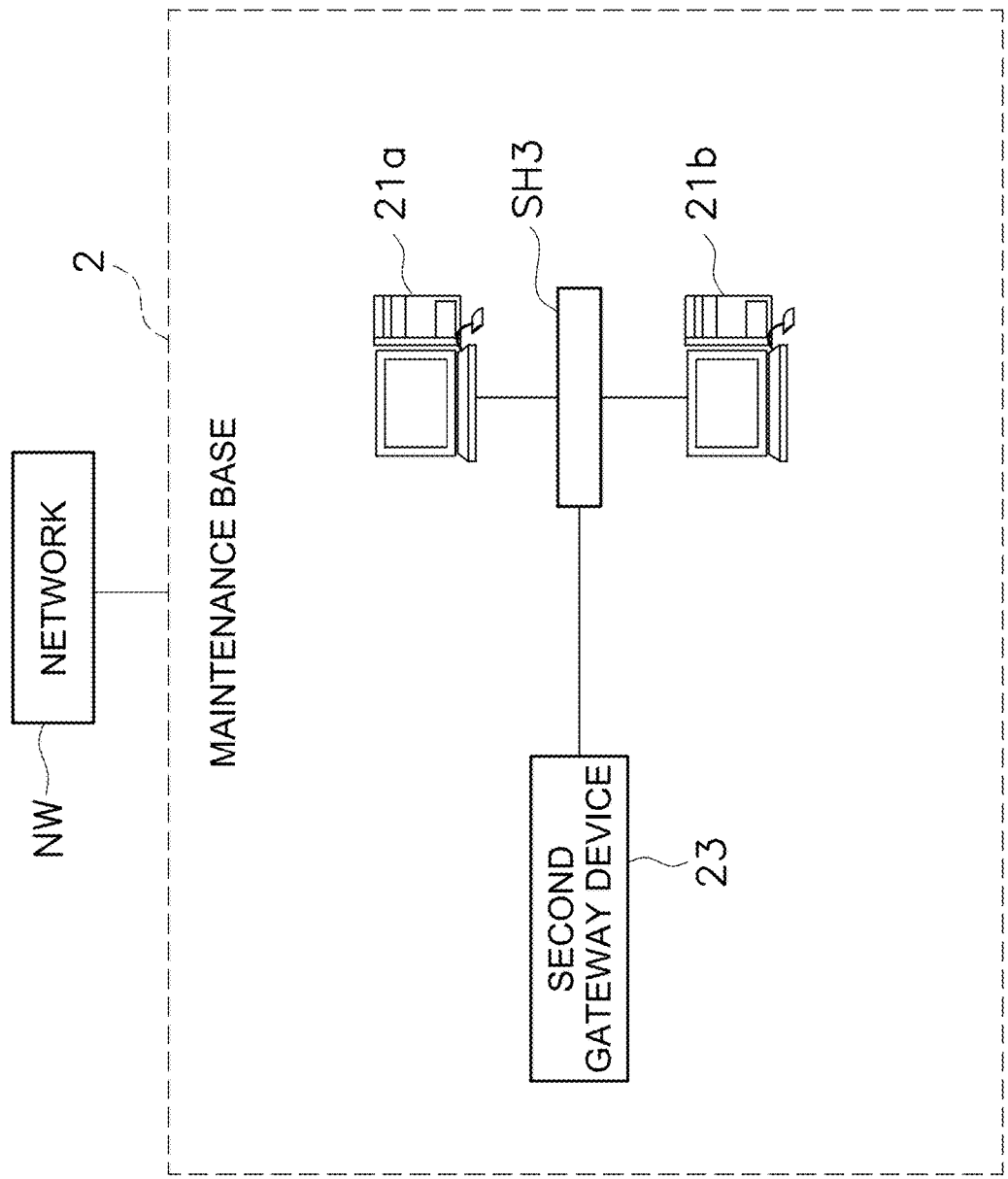
FIG. 5 is a diagram illustrating an example of a structure of a maintenance base.

With reference to FIG. 5, a detailed structure of the maintenance base 2 included in the communication system 100 is described, hereinafter. FIG. 5 is a diagram illustrating an example of a structure of the maintenance base.

The maintenance base 2 includes the maintenance terminals 21a and 21b. The maintenance terminals 21a and 21b are connected to a third switching hub SH3. The maintenance terminal 21a, 21b is a personal computer, for example, and is used by the maintenance person residing at the maintenance base 2 when maintaining a facility or the like in the automatic warehouse system 1.

The maintenance base 2 includes the second gateway device 23. The second gateway device 23 is a computer system including a CPU, a storage device (such as a RAM, a ROM, an SSD, a hard disk, or the like), and various interfaces such as a network interface. In addition, the second gateway device 23 may be hardware performing a portion or an entirety of its functions using an SoC or the like.

The second gateway device 23 is connected to the third switching hub SH3 and an external network, to relay communication between the external and the maintenance terminal 21a, 21b. Therefore, the second gateway device 23 stores a second facility list EL2 (described later), which is a list of information about the maintenance terminal 21a, 21b connected to the second gateway device 23, in the storage device.

When the second gateway device 23 receives a request to establish the VPN session from the first gateway device 19 in the automatic warehouse system 1, it performs the establishment of the VPN session with the first gateway device 19.

In addition, the second gateway device 23 has a function to upload to the maintenance server 3 the maintenance information MI at a predetermined timing, which is information stored in the maintenance terminal 21a, 21b, and/or, a core system (not shown) disposed at the maintenance base 2. It can be appropriately determined that the above-mentioned predetermined timing is every constant time period (e.g. every one hour, every day, or the like), a timing at which the new maintenance information MI is stored, a timing at which the existing maintenance information MI is updated, a timing at which the stored maintenance information MI becomes a certain size, or the like, for example.

Figure 6:
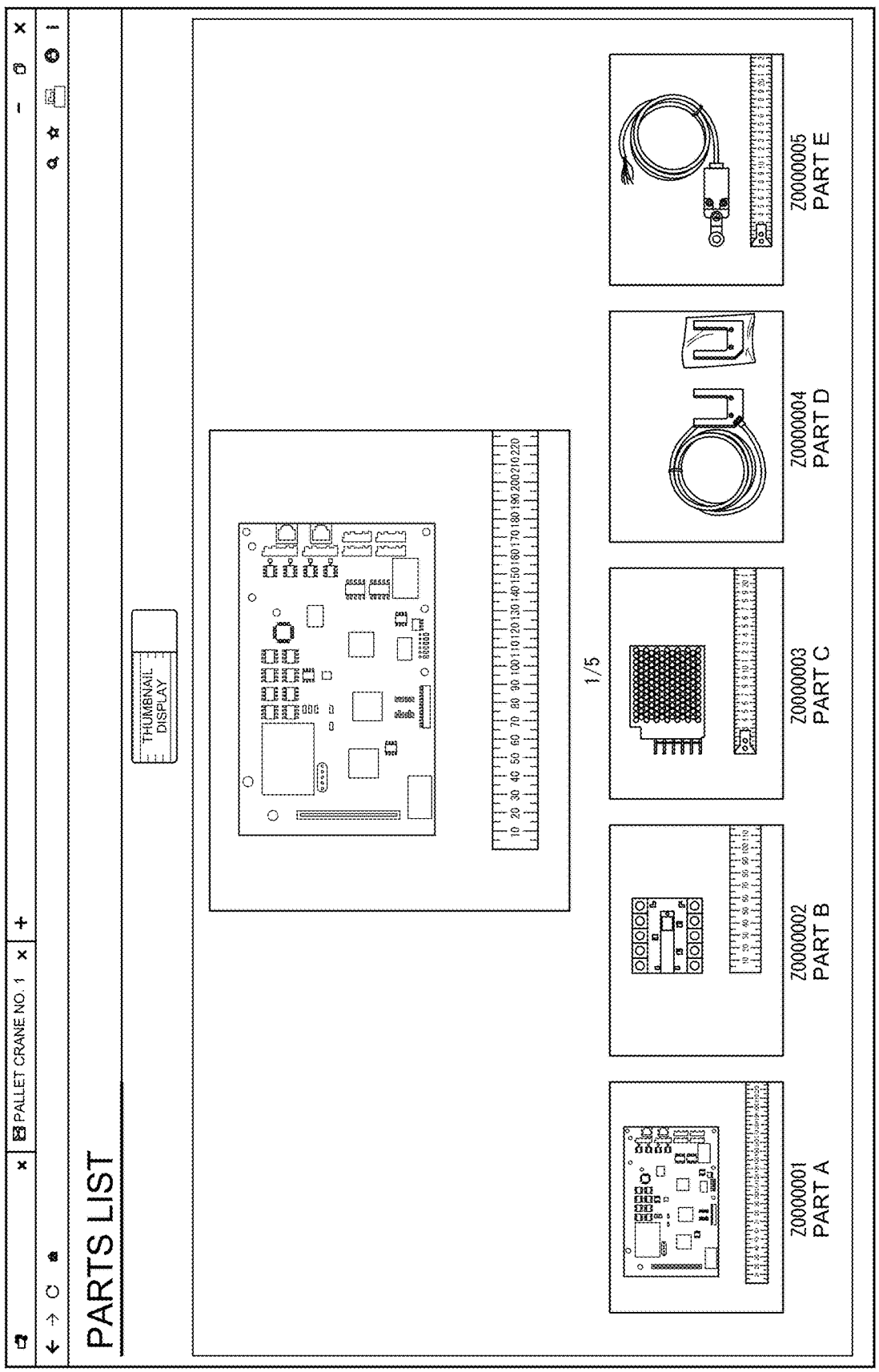
FIG. 6 is a diagram illustrating an example of maintenance information (Part 1).
Figure 7:
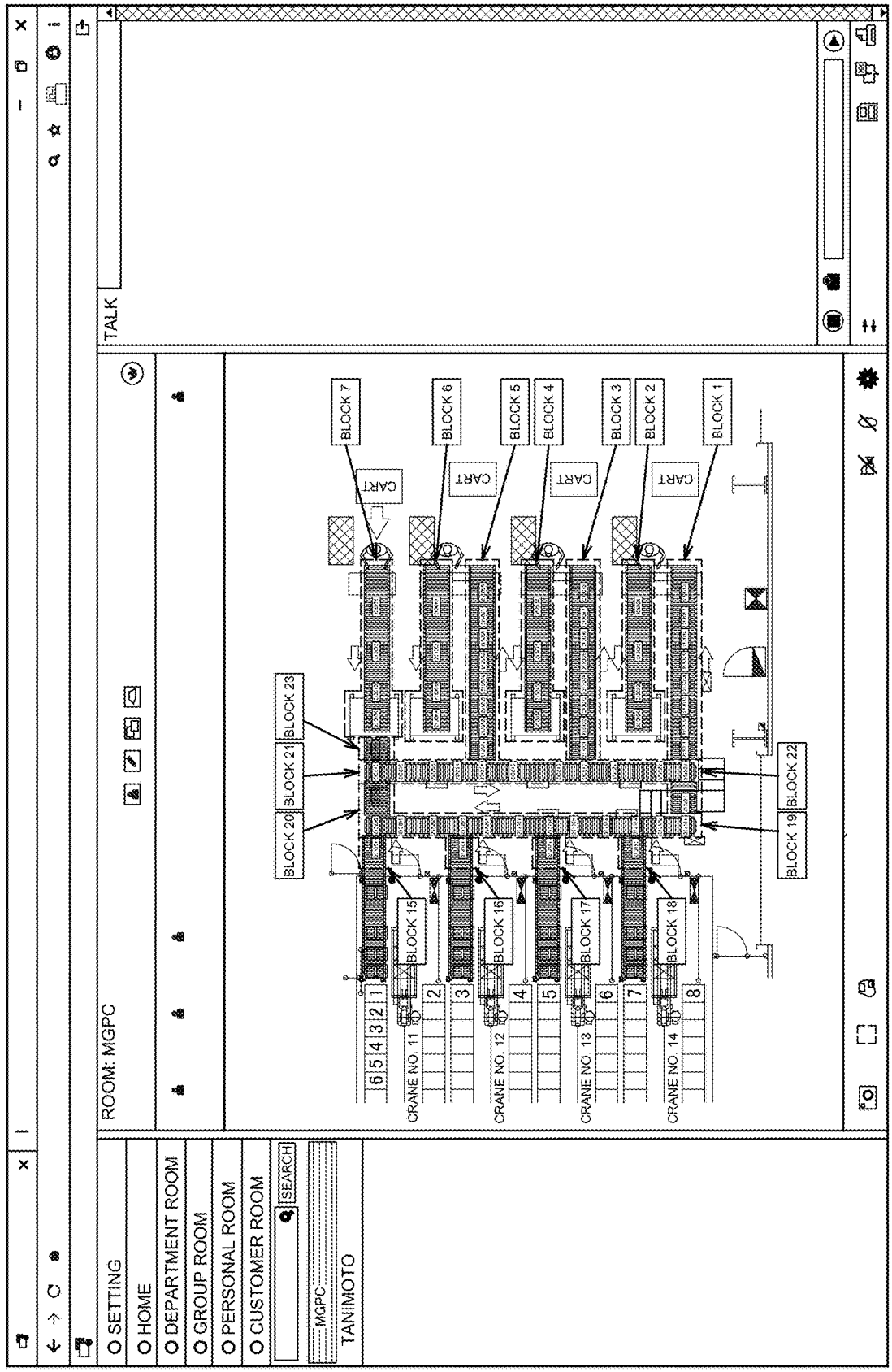
FIG. 7 is a diagram illustrating an example of maintenance information (Part 2).

As an example of the maintenance information MI, for example, there is a parts list that is a list of components of the facility as illustrated in FIG. 6, a layout diagram indicating a layout of the facility (the automatic warehouse 11) in the automatic warehouse system 1 as illustrated in FIG. 7, or the like. FIGS. 6 and 7 are diagrams illustrating examples of the maintenance information. Other than that, the second gateway device 23 can upload the maintenance information MI that is a service history of each facility in the automatic warehouse system 1, a service report of each facility, or the like, to the maintenance server 3.

The maintenance server 3 can determine that the maintenance information MI of which facility in the automatic warehouse system 1 is received from the second gateway device 23 (the maintenance base 2), based on its file name, for example.

Figure 8:
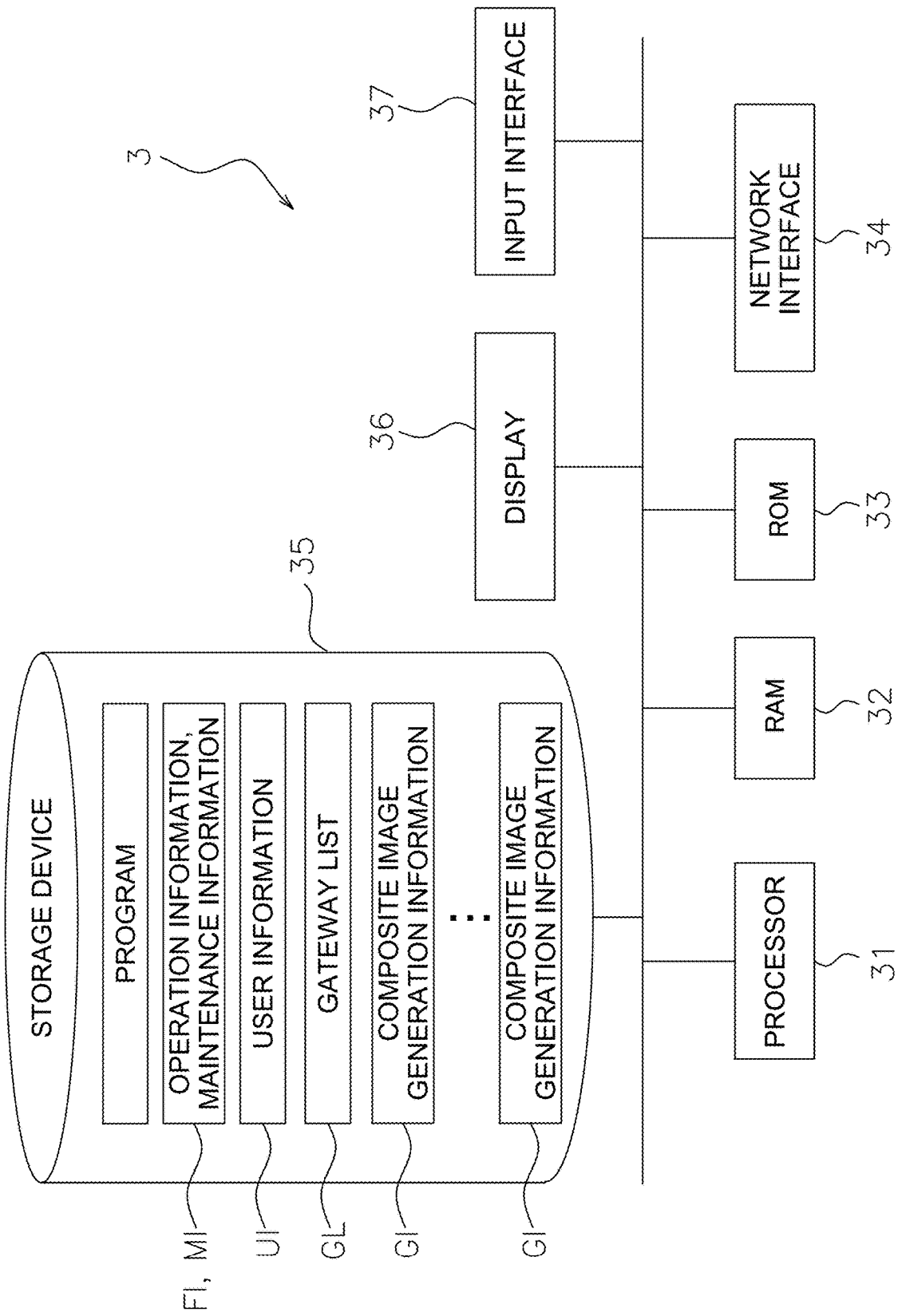
FIG. 8 is a diagram illustrating an example of a hardware structure of a maintenance server.

With reference to FIG. 8, a detailed hardware structure of the maintenance server 3 included in the communication system 100 is described below. FIG. 8 is a diagram illustrating an example of a hardware structure of the maintenance server.

As illustrated in FIG. 8, the maintenance server 3 is a computer system including a processor 31, a RAM 32, a ROM 33, a network interface 34, and a storage device 35.

The processor 31 is, for example, a CPU, or an SoC in which a CPU and various interfaces are integrated in a single chip. The processor 31 executes a program stored in the storage device 35 or the like, to perform various information processing that are carried out in the maintenance server 3.

The RAM 32 stores information needed temporarily, such as a program stored in the storage device 35. The ROM 33 stores a program, settings, and the like for controlling the maintenance server 3.

As such, the processor 31, the RAM 32, and the ROM 33 are hardware structures to perform a control that performs functions of the maintenance server 3. Therefore, these three hardware structures are referred to as a "controller" of the maintenance server 3, hereinafter. In other words, this controller executes the program stored in the storage device 35 and performs functions (operations) of the maintenance server 3 described later.

The network interface 34 performs communication with an external terminal and/or facility. The network interface 34 is, for example, an Ethernet (registered trademark) card that uses wired communication to communicate with the external terminal and/or facility, and/or, a wireless LAN interface that uses wireless communication to communicate with the external terminal and/or facility.

It should be noted that, when the maintenance server 3 sends various information and data to the external equipment, the controller outputs the information and data to the external via the network interface 34.

In addition, when the maintenance server 3 receives various information and data from the external equipment, the controller receives the information and data from the external via the network interface 34.

The storage device 35 stores the program executed by the maintenance server 3, various information to be stored in the maintenance server 3, and various setting information.

In this preferred embodiment, the various information to be stored in the maintenance server 3 is the operation information FI about the facility (the automatic warehouse 11) in the automatic warehouse system 1, and the maintenance information MI about maintenance of the facility managed at the maintenance base 2.

On the other hand, the setting information stored in the storage device 35 of the maintenance server 3 according to this preferred embodiment is user information UI, a gateway list GL, and composite image generation information GI.

The user information UI is information used to manage users who can log in to the maintenance server 3. The gateway list GL is a list to identify the first gateway device 19 installed in each automatic warehouse system 1 and the second gateway device installed in each maintenance base 2. The composite image generation information GI is information, which is generated for each automatic warehouse system 1 and each maintenance base 2, and is used to generate a composite image SI (FIG. 26A) of each automatic warehouse system 1 and for determining which maintenance terminal 21*a*, 21*b* of the maintenance base 2 is accessing.

With the structure described above, the maintenance server 3 can receive the operation information FI about the facility in the automatic warehouse system 1 and the maintenance information MI about maintenance of the facility from the automatic warehouse system 1 and the maintenance base 2, and can store the information.

In addition, as described later, the maintenance server 3 having this structure can generate an image (referred to as the composite image SI), in which an object O (described later) in a workplace image FM is associated with access information AC to the facility corresponding to the object O. In addition, in the composite image SI, it is also possible to associate each object O with the operation information FI and the maintenance information MI about the corresponding facility.

Other than the structure described above, the maintenance server 3 may include a display 36. The display 36 is, for example, a display such as a liquid crystal display or an organic EL display, which displays various information about the maintenance server 3. In this way, the user can manage the maintenance server 3 while referring to the information displayed on the display 36, for example.

The maintenance server 3 may further include an input interface 37 that receives an input from the user. The input interface 37 is an input device such as a keyboard, a mouse, or a touch panel, for example. In this way, the user can directly manage the maintenance server 3 by using the input interface 37.

It should be noted that, even if the input interface 37 and/or the display 36 described above are not included, the maintenance server 3 can be managed by using a terminal that can access to the maintenance server 3 via the network interface 34, for example, while referring to the information about the maintenance server 3.

Figure 9:
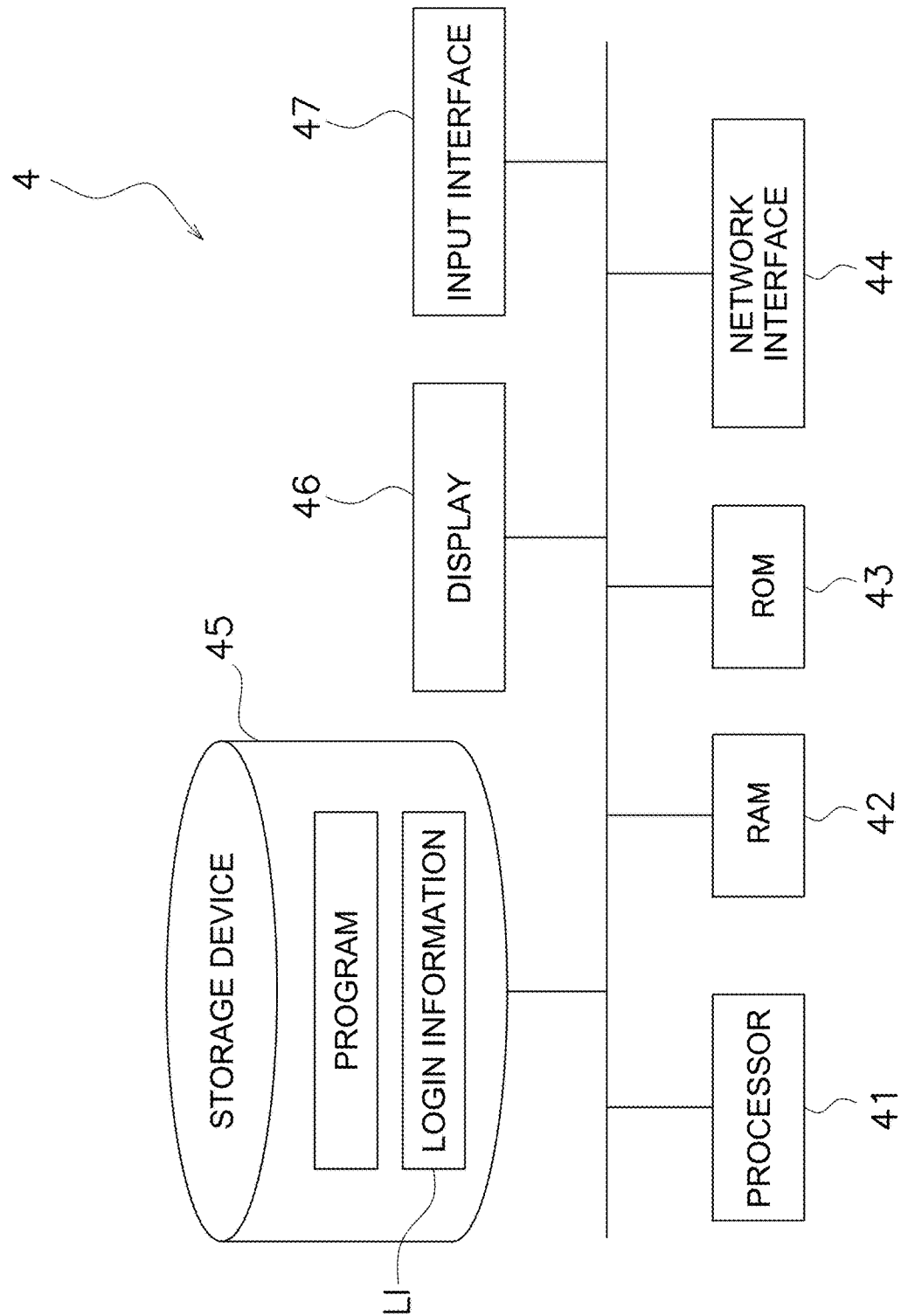
FIG. 9 is a diagram illustrating a hardware structure of a relay server.

With reference to FIG. 9, a detailed hardware structure of the relay server 4 included in the communication system 100 is described, hereinafter. FIG. 9 is a diagram illustrating a hardware structure of the relay server.

As illustrated in FIG. 9, the relay server 4 is a computer system including a processor 41, a RAM 42, a ROM 43, a network interface 44, and a storage device 45.

The processor 41 is, for example, a CPU or an SoC of a single chip in which the CPU and various interfaces are integrated. The processor 41 executes a program stored in the storage device 45 or the like, to perform various information processes to be performed by the relay server 4.

The RAM 42 stores information needed temporarily, such as a program stored in the storage device 45. The ROM 43 stores a program, settings, and the like, to control the relay server 4.

The network interface 44 performs communication with an external terminal and/or a facility. The network interface 44 is, for example, an Ethernet (registered trademark) card that uses wired communication to communicate with the external terminal and/or the facility, and/or, a wireless LAN interface that uses wireless communication to communicate with the external terminal and/or the facility.

The storage device 45 stores the program to be executed by the relay server 4 and login information LI, and is a storage device such as a hard disk or an SSD, for example. In addition, the storage device 45 stores a setting file or the like, in which setting necessary to operate the relay server 4 is described.

In another preferred embodiment, the relay server 4 may include a display 46. The display 46 displays various information about the relay server 4, and is a display such as a liquid crystal display or an organic EL display, for example. In this way, the user can manage the relay server 4 while referring to the information displayed on the display 46, for example.

In another preferred embodiment, the relay server 4 may have an input interface 47 to receive inputs from the user. The input interface 47 is, for example, an input device such as a keyboard, a mouse, or a touch panel. In this way, the user can directly manage the relay server 4 by using the input interface 47.

It should be noted that even if the input interface 47 and/or the display 46 described above are not provided, the relay server 4 can be managed while referring to the information about the relay server 4, by using a terminal that can access to the relay server 4 via the network interface 44, for example.

The information stored in the maintenance server 3, the relay server 4, the first gateway device 19, and the second gateway device 23 is described, hereinafter. First, the information managed by the maintenance server 3 is described. As described above, the maintenance server 3 stores the user information UI, the composite image generation information GI, and the gateway list GL in the storage device 35.

As illustrated in FIG. 10A, the gateway list GL is, for example, a list in which the identification information of each automatic warehouse system 1 and the identification information of the first gateway device 19 in the automatic warehouse system 1 are associated with each other. In addition, the gateway list GL stores the identification information of each maintenance base 2 and the identification information of the second gateway device 23 at the maintenance base 2 associated with each other. FIG. 10A is a diagram illustrating an example of the gateway list.

The identification information of each automatic warehouse system 1 and each maintenance base 2 are, for example, identification numbers of the automatic warehouse system 1 and the maintenance base 2. Among the identification information, the identification number of the automatic warehouse system 1 is included also in the composite image generation information GI described later. In the example illustrated in FIG. 10A, the automatic warehouse system 1 has a 100*s* identification number, and the maintenance base 2 has a 200*s* identification number. The identification numbers of the automatic warehouse system 1 and the maintenance base 2 are not limited to the example illustrated in FIG. 10A but can be arbitrarily set.

On the other hand, the identification information of the first gateway device 19 and the second gateway device 23 are, for example, login IDs for the first gateway device 19 and the second gateway device 23 to log in to the relay server 4. Other than that, network addresses (IP addresses) of the first gateway device and the second gateway device 23 can be the identification information of the gateway device.

The user information UI stores the user ID and the password to log into the maintenance server 3. In addition, the user information UI is associated with a user type for each user ID. The user type indicates whether the user ID is for the maintenance person or for the operator or the like other than the maintenance person. Other than that, the user information UI may store information of each user (such as an affiliation, a contact address, and an authority level of the user).

Figure 10B:
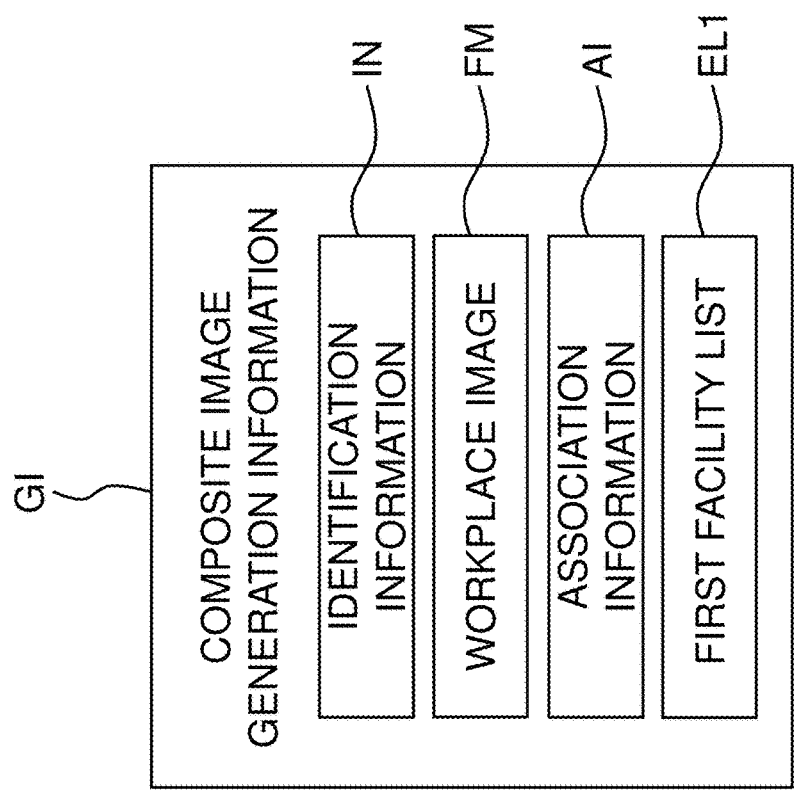
FIG. 10B is a diagram illustrating a structure of composite image generation information.

As illustrated in FIG. 10B, the composite image generation information GI includes identification information IN, the workplace image FM, association information AI, and the first facility list EL1. FIG. 10B is a diagram illustrating a structure of the composite image generation information. The identification information IN is information to identify the automatic warehouse system 1 and is the same as the identification information of the gateway list GL.

The workplace image FM is an image showing the automatic warehouse system 1. Specifically, the workplace image FM is a photograph image or a digital model of the automatic warehouse system 1. The workplace image FM visualizes the facilities of the automatic warehouse system 1 as images. The visualized image of the facility is referred to as the object O.

The association information AI is information storing association between the facility in the automatic warehouse system 1 and the operation information FI and the maintenance information MI. In addition, in the association information AI, the facility in the automatic warehouse system 1 is associated with the access information to access to the facility AC (described later) from the maintenance terminal 21a, 21b.

The first facility list EL1 is the list of information about facilities connected to the first gateway device 19. Its detailed structure will be described later.

Next, information managed by the relay server 4 is described. The login information LI managed by the relay server 4 stores the user ID to log into the relay server 4. It should be noted that the login information LI includes the user IDs of the first gateway device 19 and the second gateway device 23. In other words, the first gateway device 19 and the second gateway device 23 log in to the relay server 4.

It should be noted that in the login information LI, the user ID of the gateway device is associated with the network address (such as the IP address) of the gateway device having the corresponding user ID. In this way, the relay server 4 can know the network address of the corresponding gateway device from the user ID of the gateway device, and can access to the gateway device.

Lastly, the information managed by the gateway device is described. Each gateway device manages a list of information about facilities connected to its LAN. The first gateway device 19 manages the first facility list EL1 illustrated in FIG. 11A. On the other hand, the second gateway device 23 manages the second facility list EL2 illustrated in FIG. 11B. FIG. 11A is a diagram illustrating an example of a data structure of the first facility list. FIG. 11B is a diagram illustrating an example of a data structure of the second facility list.

It should be noted that the facility lists illustrated in FIGS. 11A and 11B are merely examples, and facility types and the number of the facilities in the list are different depending on sizes or the like of the automatic warehouse system 1 and the maintenance base 2.

As illustrated in FIG. 11A, the first facility list EL1 managed by the first gateway device 19 includes a facility name record portion R1, an address record portion R2, a sub ID record portion R3, a sub-type record portion R4, and a state record portion R5.

The facility name record portion R1 records a name of the facility. As illustrated in FIG. 11A, in the first facility list EL1, it records names of the cameras CA1 to CA4 (crane #1 camera to conveyor #2 camera), a name of the sensor SE (crane #1 sensor), a name of the first external storage device 13a (external storage device #1), a name of the second external storage device 13b (external storage device #2), a name of the information management server 15b (information management server), and a name of the conveyance management server 15a (conveyance management server).

The address record portion R2 records the network addresses assigned to the facilities that can connect to the gateway device. In the first facility list EL1, IP addresses "192.168.0.1" to "192.168.0.4" are recorded in the lines having the names of cameras CA1 to CA4, respectively. In addition, IP address "192.168.0.11" is recorded in the line having the name of sensor SE.

Further, IP addresses "192.168.0.21" and "192.168.0.22" are recorded in the lines having the names of external storage device #1 and external storage device #2, respectively. IP addresses "192.168.0.31" and "192.168.0.32" are recorded in the lines having the names of information management server and conveyance management server, respectively.

In addition, IP addresses "192.168.0.111" and "192.168.0.112" are recorded in the lines having names of the control devices (control panels) of the stacker cranes. IP address "192.168.0.41" and "192.168.0.42" are recorded in the lines having the names of the control devices (PLCs) of the conveyors.

As described later, the IP address recorded in the address record portion R2 described above is used to communicate between the facilities connected to the gateway devices when the communication session is established between the gateway devices.

The sub ID record portion R3 records the login ID (sub ID) for the facility to log in to the relay server 4. In the first facility list EL1, the sub IDs "cam001" to "cam004" are recorded in the lines having the names of cameras CA1 to CA4, respectively, and the sub ID "sen001" is recorded in the line having the name of sensor SE.

In addition, the sub IDs "ctr1001" and "ctr1002" are recorded in the lines having the names of "control panel". The sub IDs "PLC001" and "PLC002" are recorded in the lines having the name of "PLC".

The sub-type record portion R4 records the user types (sub-types) indicating types of the facilities connected to the gateway device. In the first facility list EL1, the sub-type "camera" is recorded in the lines having the names of camera CA1 to camera CA4. The sub-type "sensor" is recorded in the line having the name of sensor SE.

In addition, the sub-type "controller" is recorded in the lines having the name of "control panel". The sub-type "PLC" is recorded in the lines having the name of "PLC".

The state record portion R5 records whether or not each facility recorded in the facility list is ready to communicate with the gateway device. In the example of the first facility list EL1, "NG" is recorded in the lines having the names of camera CA3 and camera CA4, for example. In contrast, "OK" is recorded in other lines. In other words, the cameras CA3 and CA4 are not ready to communicate with the first gateway device 19.

In this way, in the state record portion R5, "OK" is recorded for facilities that are ready to communicate with the gateway device, while "NG" is recorded for facilities that are not ready to communicate, among facilities connected to the gateway device (the facilities).

As illustrated in FIG. 11A, the access information AC is information of one line in the first facility list EL1, i.e., information including at least the IP address, the name of the facility, the sub ID, the sub-type, and the state of one facility, and this is associated with the object O in the workplace image FM.

Next, with reference to FIG. 11B, the second facility list EL2 managed by the second gateway device 23 is described. Similarly to the first facility list EL1, the second facility list EL2 includes the facility name record portion R1, the address record portion R2, the sub ID record portion R3, the sub-type record portion R4, and the state record portion R5.

In the second facility list EL2, the facility name record portion R1 records a name of the maintenance terminal 21a (maintenance terminal #1) and a name of the maintenance terminal 21b (maintenance terminal #2). In addition, the address record portion R2 records the IP addresses "172.28.0.2" and "172.28.0.3" in the lines having the facility names of the maintenance terminals 21a and 21b, respectively.

On the other hand, in the second facility list EL2, no information is recorded in the sub ID record portion R3, the sub-type record portion R4, and the state record portion R5. This means that the maintenance terminals 21a and 21b cannot log in to the relay server 4.

Figure 12:
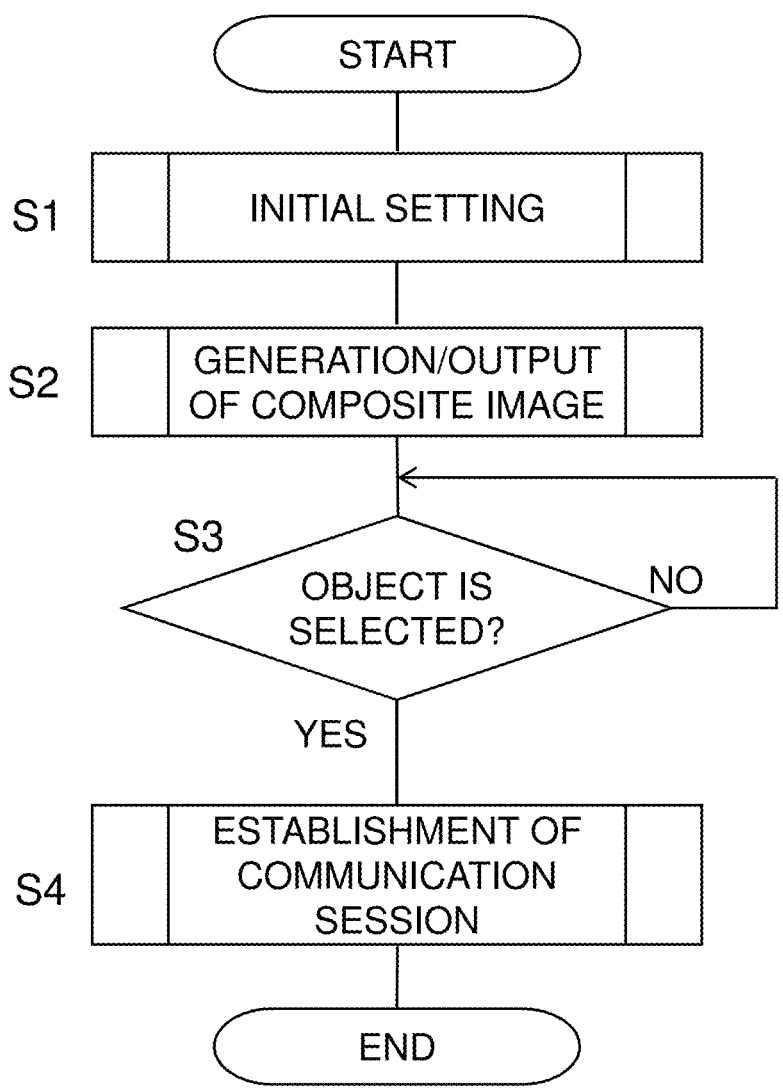
FIG. 12 is a flowchart illustrating a schematic operation of the maintenance server.

An operation of the maintenance server 3 in the communication system 100 according to this preferred embodiment is described, hereinafter. First, with reference to FIG. 12, a schematic operation of the maintenance server 3 is described. FIG. 12 is a flowchart illustrating a schematic operation of the maintenance server.

When accessing to each facility in the automatic warehouse system 1 using the maintenance terminal 21a, 21b at a remote place, the maintenance server 3 makes it possible to easily identify a desired facility and to access to the same quickly. In order to perform this function, the maintenance server 3 performs the process according to the flowchart of FIG. 12. It should be noted that the operation illustrated in FIG. 12 is an operation for one automatic warehouse system 1. The maintenance server 3 performs the operation illustrated in FIG. 12 individually for each of the plurality of automatic warehouse systems 1 included in the communication system 100.

Specifically, first in Step S1, the maintenance server performs an initial setting operation for generating the composite image SI. After performing the initial setting operation, the maintenance server 3 generates the composite image SI in Step S2, by using the information and the like generated and acquired in the initial setting operation. The maintenance server 3 outputs the generated composite image SI to the corresponding maintenance terminal 21a, 21b. When receiving the composite image SI, the maintenance terminal 21a, 21b displays the composite image SI on the display (not shown).

After outputting the composite image SI, the maintenance server 3 receives selection of the object O in the composite image SI using the maintenance terminal 21a, 21b in Step S3.

When receiving the selection of the object O in Step S3 ("Yes" in Step S3), the maintenance server 3 instructs to establish a communication session between the facility corresponding to the selected object O and the maintenance terminal 21a, 21b in Step S4, by using the access information AC associated with the selected object O.

Figure 13:
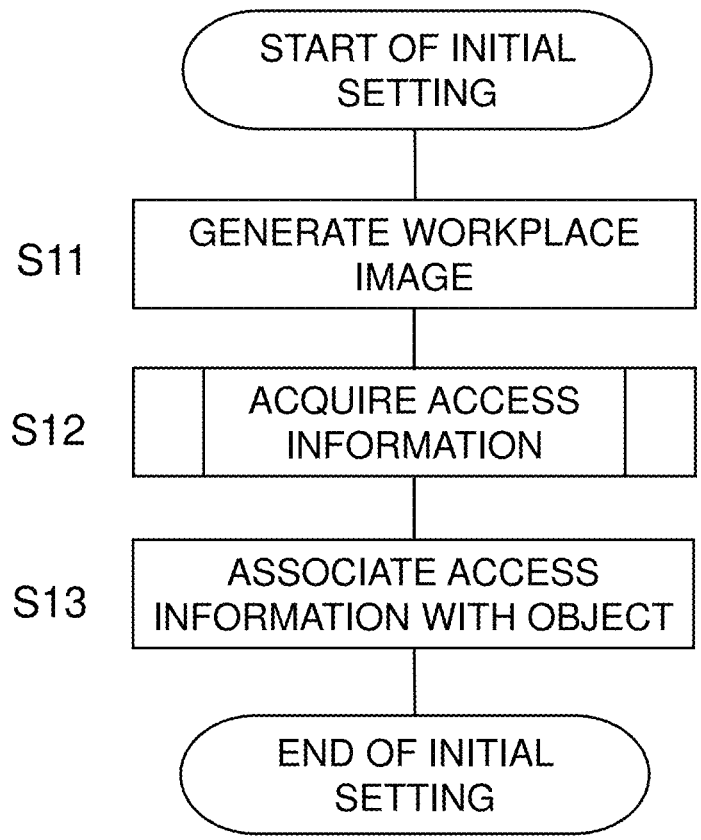
FIG. 13 is a flowchart illustrating an initial setting operation.

With reference to FIG. 13, the above-mentioned initial setting operation in Step S1 is specifically described, hereinafter. FIG. 13 is a flowchart illustrating the initial setting operation.

In the initial setting operation, the workplace image FM is generated first in Step S11 and is stored in the storage device 35 of the maintenance server 3.

If the workplace image FM is a photograph image of the automatic warehouse system 1, the photograph images are taken at a plurality of locations in the automatic warehouse system 1. Next, considering a location in the automatic warehouse system 1 at which each photograph image was taken, the plurality of photograph images are combined to generate the workplace image FM. Other than that, it may be possible to take a panorama image as the photograph image to be the workplace image FM.

On the other hand, if the workplace image FM is a digital model of the automatic warehouse system 1, a CAD or the like is used, for example, to draw a three-dimensional image of the automatic warehouse system 1 to be the workplace image FM.

Next, in Step S12, the maintenance server 3 acquires the access information AC for accessing each facility in the automatic warehouse system 1, from the maintenance terminal 21a, 21b. In this preferred embodiment, the access information AC is acquired from the relay server 4. The acquiring operation of the access information AC will be described later in detail.

After acquiring the access information AC, the maintenance server 3 associates the acquired access information AC with the object O in the workplace image FM in Step S13. This association is performed as follows, for example.

First, in the workplace image FM, the image indicating the facility in the automatic warehouse system 1 is identified as the object O. After that, coordinate values of each of the identified objects O are acquired. The coordinate values of the object O may be a location (coordinate values) of pixels indicating the object O in the workplace image FM, for example.

Next, the coordinate values of the object O and the access information AC to the facility corresponding to the object O are associated with each other and stored in the association information AI.

By performing Steps S11 to S13 described above, the maintenance server 3 can obtain information necessary to generate the composite image SI. In other words, the maintenance server 3 can obtain the composite image generation information GI by associating the workplace image FM, the association information AI, the first facility list EL1 including the access information AC, and the identification information IN of the automatic warehouse system 1.

It should be noted that the maintenance server 3 receives the operation information FI and the maintenance information MI from the automatic warehouse system 1 and the maintenance base 2 that have the information, in Step S13 described above. After that, the maintenance server 3 further associates each object O in the workplace image FM with the operation information FI and the maintenance information MI of the corresponding facility, and stores the result in the association information AI. In this case, the maintenance server 3 associates each object O with a link to the operation information FI and the maintenance information MI.

As described above, the operation information FI includes the abnormality information indicating an abnormality that occurs in the facility in the automatic warehouse system 1. Therefore, by associating the operation information FI to each object O in the workplace image FM, the composite image SI can be generated by associating the abnormality information to the object O corresponding to the facility in which the abnormality occurred.

In addition, as the initial setting operation, the maintenance server 3 may perform a setting operation such as user registration to log into the maintenance server 3 or access restriction to information for each user.

Figure 14:
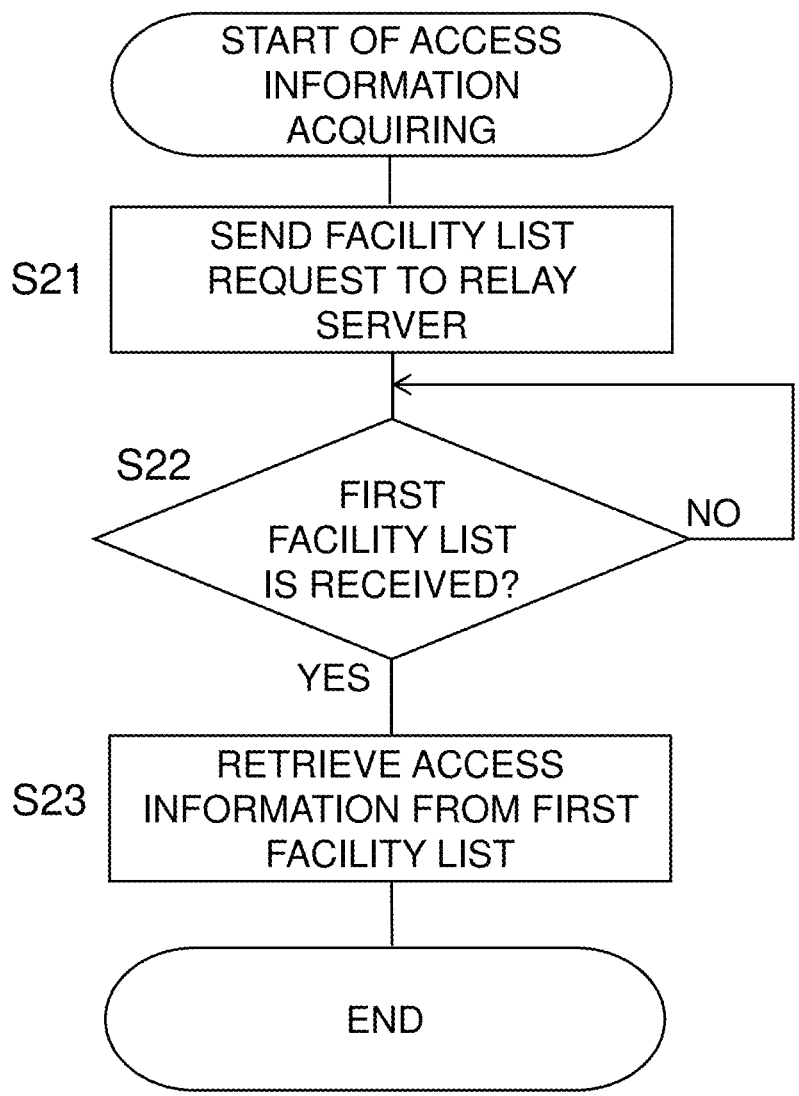
FIG. 14 is a flowchart illustrating an access information acquiring operation.
Figure 15:
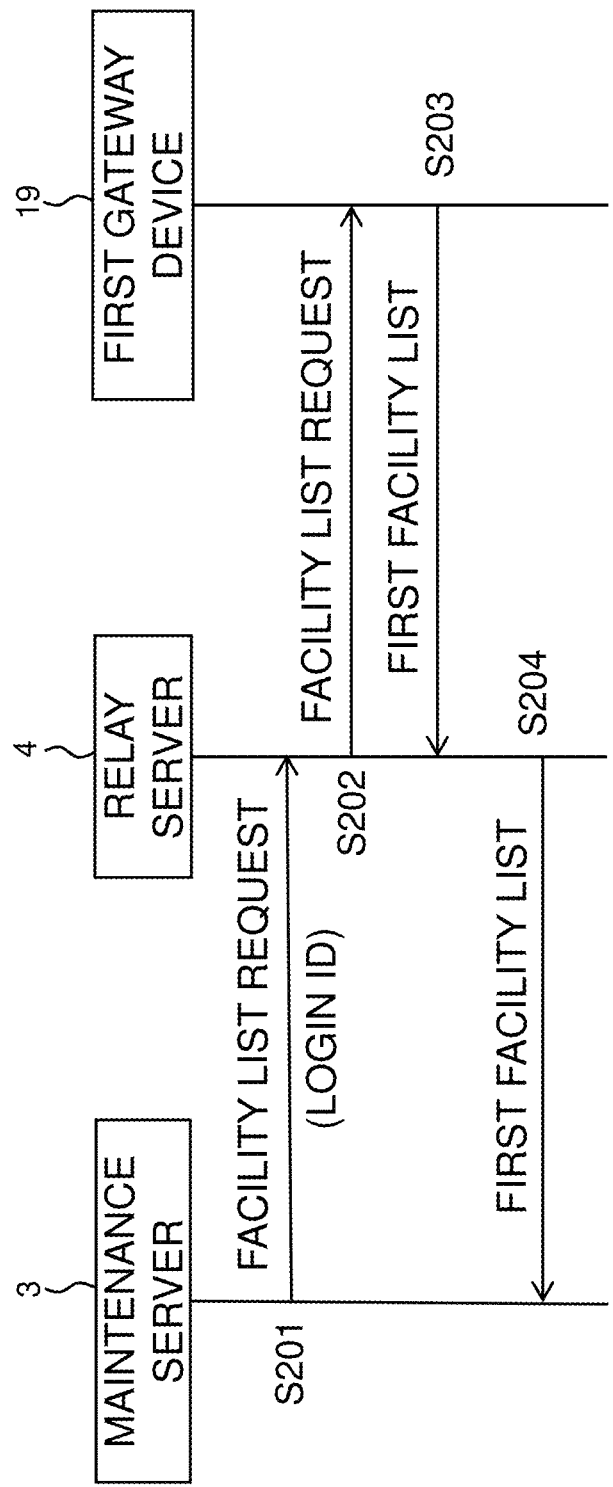
FIG. 15 is a diagram illustrating transmission and reception of information in acquisition of access information.

Next, with reference to FIGS. 14 and 15, the operation of Step S12 in the initial setting operation described above, i.e., the acquiring operation of the access information AC is described in more detail. FIG. 14 is a flowchart illustrating the access information acquiring operation. FIG. 15 is a diagram illustrating transmission and reception of information in acquisition of the access information.

In order to acquire the access information AC, the maintenance server 3 sends a facility list request signal to the relay server 4 in Step S21.

Specifically, the maintenance server 3 first identifies the identification number of the automatic warehouse system 1 having the desired access information AC. After that, in the gateway list GL, the login ID of the first gateway device 19 associated with the identified identification number is identified.

After the login ID is identified, the maintenance server 3 sends the identified login ID to the relay server 4 together with the facility list request signal (Step S201).

When receiving the request signal described above, the relay server 4 identifies which first gateway device 19 in the automatic warehouse system 1 has the login ID sent with the request signal. After that, the relay server 4 sends the facility list request signal to the first gateway device 19 identified as described above (Step S202).

When receiving the facility list request signal from the relay server 4 (Step S202), the first gateway device 19 sends the first facility list EL1 stored in it to the relay server 4 (Step S203).

After that, when acquiring the desired first facility list EL1 from the first gateway device 19 (Step S203), the relay server 4 sends the first facility list EL1 to the maintenance server 3 (Step S204).

When receiving the first facility list EL1 from the relay server 4 ("Yes" in Step S22), the maintenance server 3 stores the acquired first facility list EL1 as the composite image generation information GI in the storage device 35. After that, the maintenance server 3 retrieves the access information AC of each facility from the stored first facility list EL1.

As described above, the maintenance server 3 receives the desired first facility list EL1 from the corresponding first gateway device 19 via the relay server 4, and can retrieve and acquire the access information AC from the received first facility list EL1.

Figure 16:
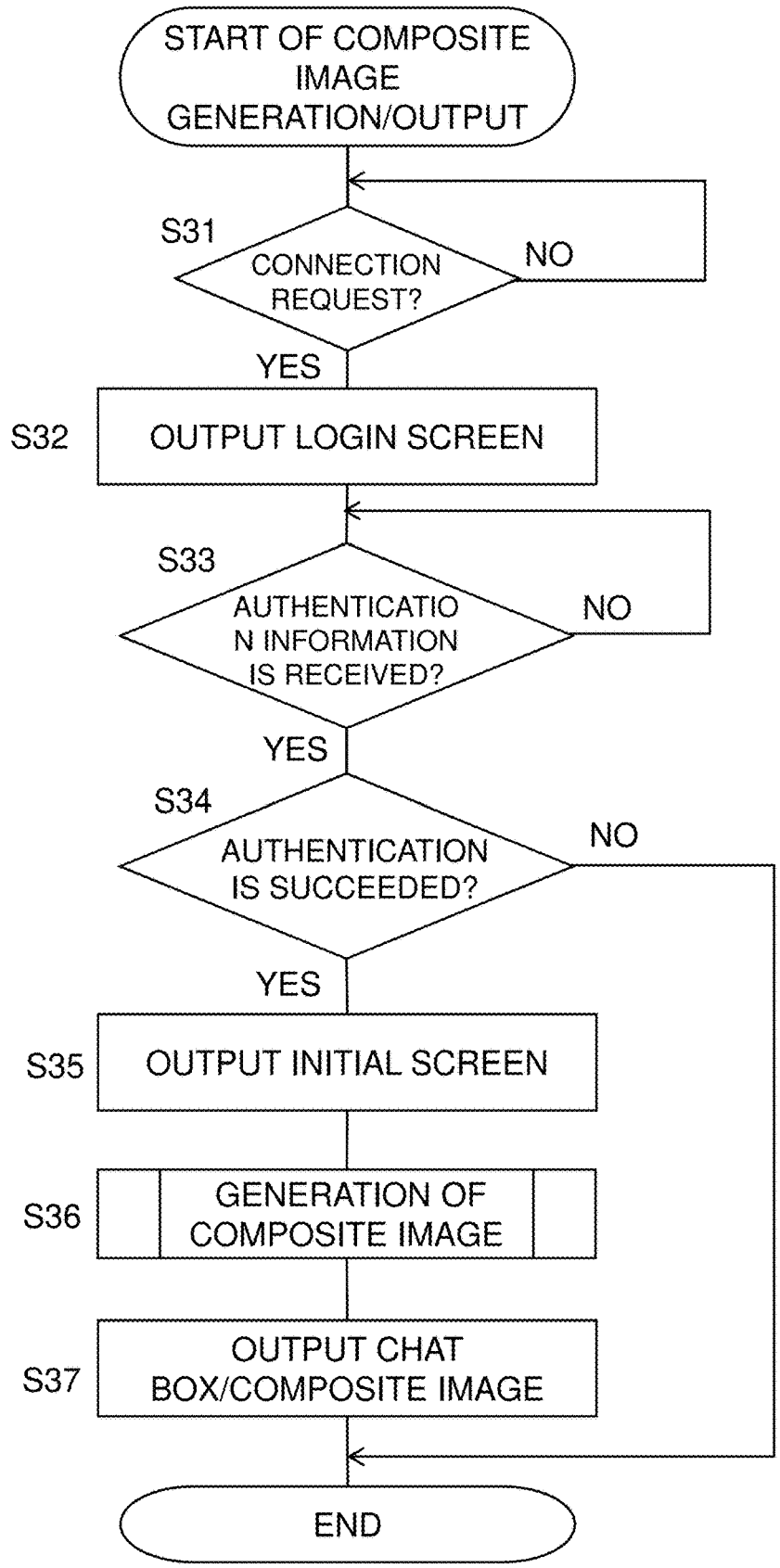
FIG. 16 is a flowchart illustrating an operation of the maintenance server in operations until output of composite image.
Figure 17:
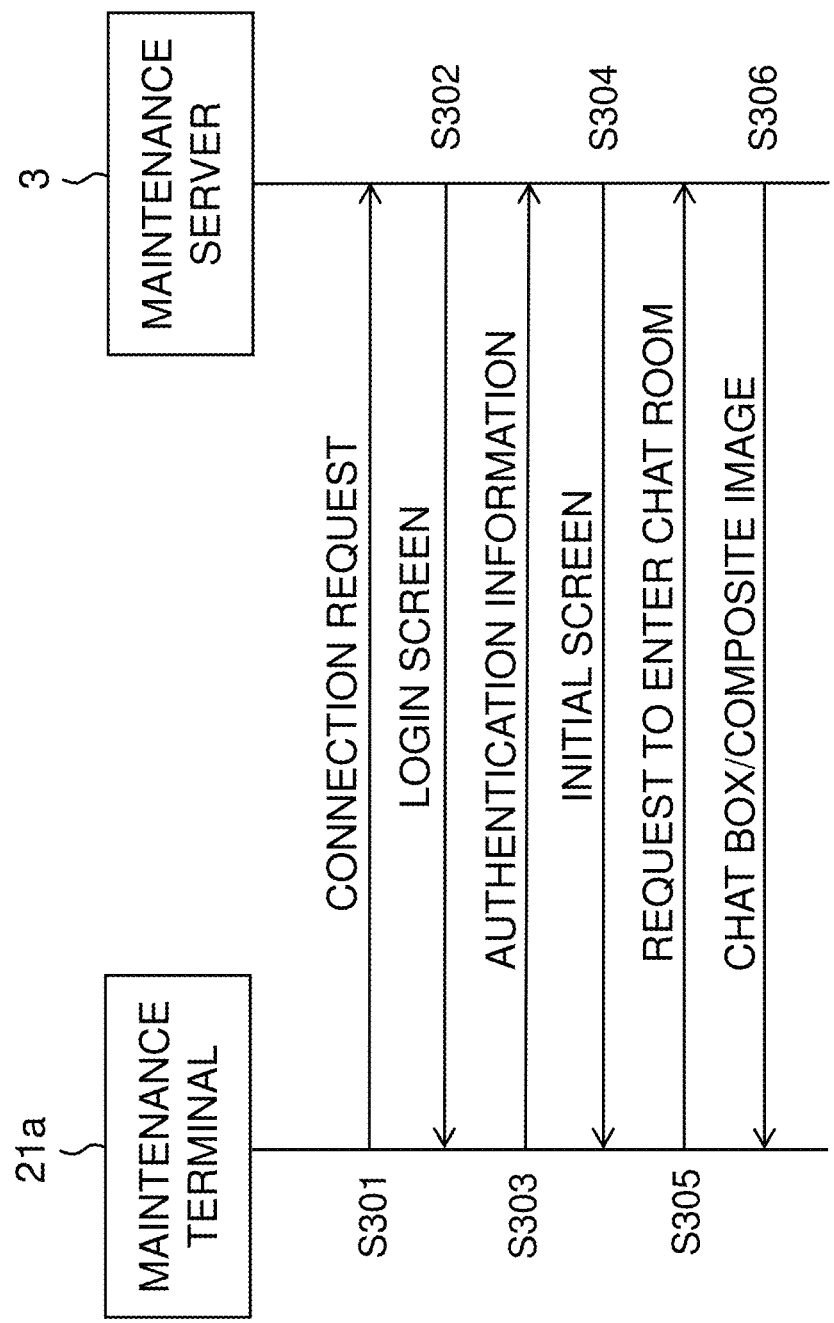
FIG. 17 is a diagram illustrating transmission and reception of information in the operations until output of the composite image.

Next, a detailed operation of generating and outputting the composite image SI in Step S2 is described with reference to FIGS. 16 and 17. FIG. 16 is a flowchart illustrating an operation of the maintenance server in operations until the output of composite image. FIG. 17 is a diagram illustrating transmission and reception of information in operations until the output of the composite image. The following description exemplifies a case where the maintenance person at the maintenance base 2 uses the maintenance terminal 21a to access to the maintenance server 3.

The generation and output of the composite image SI starts when the maintenance terminal 21a sends a connection request to the maintenance server 3 that has finished the initial setting operation and is in operation (Step S301). Specifically, for example, in a web browser on the maintenance terminal 21a, an address of the maintenance server 3 is designated, and this web browser outputs the connection request to the maintenance server 3.

Figure 18:
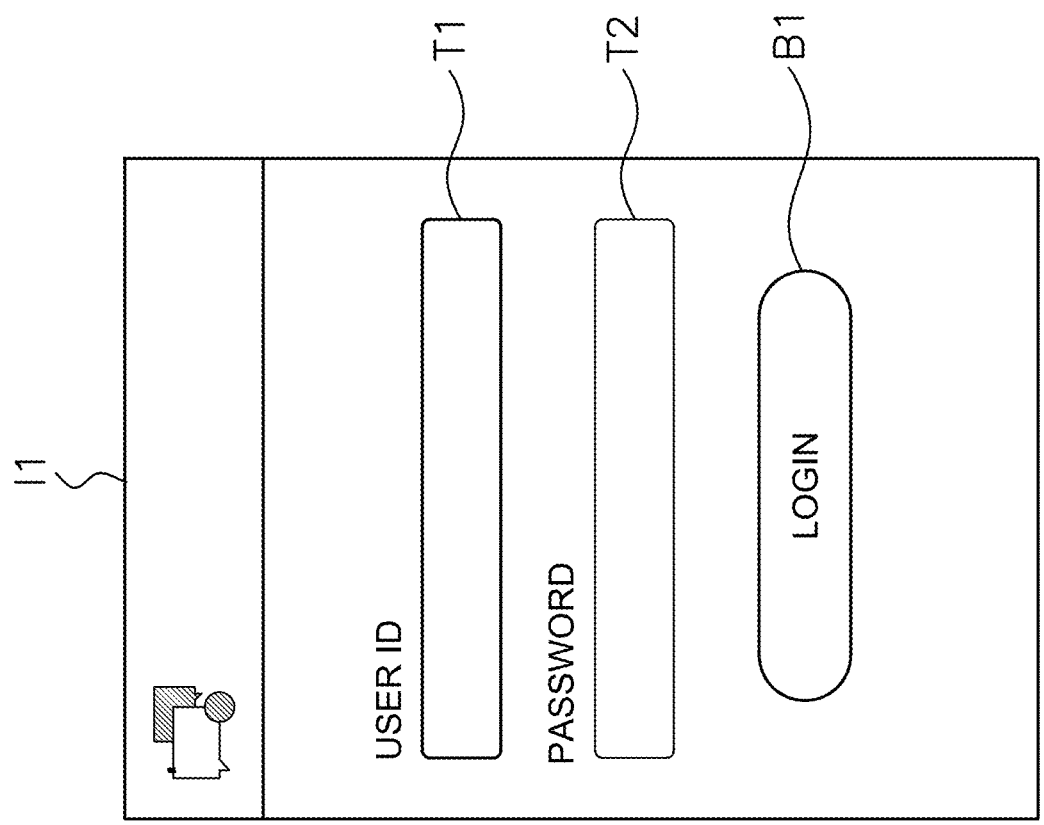
FIG. 18 is a diagram illustrating an example of a login screen.

When receiving the connection request ("Yes" in Step S31), the maintenance server 3 outputs a login screen I1 to the maintenance terminal 21a that has sent the connection request, in Step S32 (Step S302). For instance, the login screen I1 as illustrated in FIG. 18 is output. FIG. 18 is a diagram illustrating an example of the login screen.

On the login screen I1 displayed on the maintenance terminal 21a, the maintenance person inputs his or her user ID to a user ID input box T1, and inputs his or her password to a password input box T2. After that, when a login button B1 is pressed, the inputted user ID and password are outputted as the authentication information to the maintenance server 3 (Step S303).

When receiving the authentication information from the maintenance terminal 21a ("Yes" in Step S33), the maintenance server 3 performs the authentication operation in Step S34. Specifically, the maintenance server 3 compares the received authentication information, i.e., the user ID and the password with the user ID and the password stored in the user information UI.

As a result of the comparison described above, if the authentication fails ("No" in Step S34) due to the reason that the received authentication information does not exist in the user information UI, or that the received authentication information does not match the user ID and the password stored in the user information UI, or other reason, the maintenance server 3 ends the composite image output process.

If the authentication has failed, the maintenance server 3 notifies the maintenance terminal 21a, which is trying to log in, that the authentication has failed. In addition, the maintenance server 3 may end the composite image output process after the authentication fails a predetermined number of times.

In contrast, if the authentication is succeeded using the received authentication information ("Yes" in Step S34), the maintenance server 3 outputs an initial screen I2 (FIG. 25) to the maintenance terminal 21a that has been successfully authenticated, in Step S25 (Step S304). A structure of the initial screen I2 will be described later.

After the initial screen I2 is displayed on the maintenance terminal 21a, the maintenance person uses the initial screen I2 to select the room to enter. The operator terminal 17 or the maintenance terminal 21a sends a request to join chat in the selected room to the maintenance server 3 as a request to enter chat room (Step S305).

Figure 19:
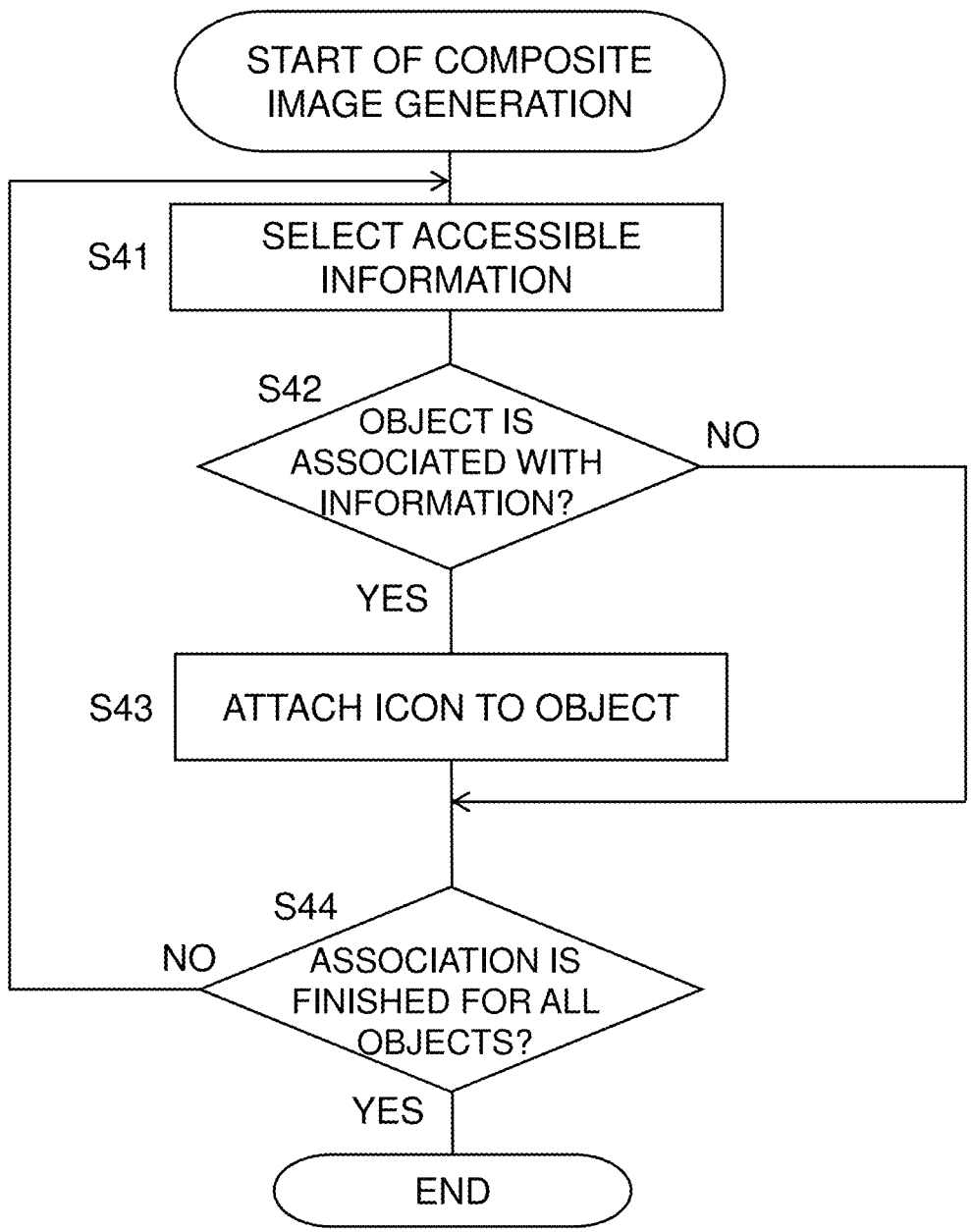
FIG. 19 is a flowchart illustrating a composite image generation operation.

When receiving the request to enter chat room from the maintenance terminal 21a, the maintenance server 3 generates the composite image SI in Step S36. The generation operation of the composite image SI performed in Step S36 is described in more detail with reference to FIG. 19, hereinafter. FIG. 19 is a flowchart illustrating the composite image generation operation.

First in Step S41, the maintenance server 3 selects the operation information FI and the maintenance information MI that the target maintenance person can access, and the facility that the maintenance person can access, for each facility corresponding to the object O in the workplace image FM.

Specifically, the maintenance server 3 determines the accessible operation information FI and maintenance information MI for the maintenance person identified by the user ID. In addition, it determines the accessible facility for the maintenance person.

Next, the maintenance server 3 refers to the association information AI, and retrieves the operation information FI and the maintenance information MI that can be accessed by the target maintenance person, among the operation information FI, the maintenance information MI, and the access information AC associated with each object O. In addition, it retrieves the access information AC of the facility that the maintenance person can access.

Further, the maintenance server 3 associates each object O with the operation information FI, the maintenance information MI, and the access information AC retrieved for the corresponding facility, to generate unique association information for each target maintenance person.

After generating the unique association information, the maintenance server 3 determines in Step S42 whether or not each object O in the workplace image FM is associated with the operation information FI, the maintenance information MI, or the access information AC in the unique association information.

In the unique association information, if the object O is not associated with any one of the operation information FI, the maintenance information MI, and the access information AC ("No" in Step S42), the generating process of the composite image SI proceeds to Step S44.

On the other hand, if any one of the operation information FI, the maintenance information MI, and the access information AC is associated with the object O in the unique association information ("Yes" in Step S42), the maintenance server 3 attach a predetermined icon to a coordinate position at which the object O exists in the workplace image FM, in Step S43. This predetermined icon shows that the operation information FI and/or the maintenance information MI are associated with the object O.

In addition, if the facility corresponding to this object O can be accessed by using the maintenance terminal 21a, the access information AC of the corresponding facility is displayed in the icon of the object O. It should be noted that, as described later, a type (shape) of the attached icon is different depending on a type of the associated operation information FI and/or maintenance information MI.

After attaching the icon, the maintenance server 3 generates a link enabling to refer to the operation information FI and the maintenance information MI selected in Step S41 by clicking the icon, based on the unique association information described above.

At the same time, it generates a command to output an instruction to establish a communication session (referred to as a session establishment instruction) using the access information AC selected in Step S41, by clicking the icon in which the access information AC is displayed.

Here, the link to the operation information FI and/or the maintenance information MI provides access to information indicating a storage location of the operation information FI and/or the maintenance information MI in the maintenance server 3. The link is, for example, a URL to access to the operation information FI and/or the maintenance information MI.

In the automatic warehouse system 1 having many facilities, there are usually a plurality of operation information FI and maintenance information MI that are associated with one object O (facility). Therefore, in this preferred embodiment, links to the operation information FI and the maintenance information MI associated with each object O are listed and are managed as the list. In addition, in this preferred embodiment, a link to this list is associated with each object O.

On the other hand, since the access information AC varies for each facility, the command to output the communication session establishment instruction is associated directly with each object O.

By the above-mentioned process, in the workplace image FM, the icon can be attached to the object O with which any one of the operation information FI, the maintenance information MI, and the access information AC is associated, while no icon can be attached to the object O with which no information is associated.

After attaching the icon to the object O as necessary, it is checked in Step S44 whether or not Steps S41 to S43 described above have been performed for every object O in the workplace image FM. In other words, it is checked whether or not the operation information FI, the maintenance information MI, and the access information AC that are to be associated with the object O are determined for every object O.

If the information association is not performed for every object O ("No" in Step S44), Steps S41 to S43 described above are further performed for other objects O.

In contrast, if the information association is performed for every object O ("Yes" in Step S44), generation of the composite image SI (FIG. 26A) ends.

Although a detailed structure will be described later, in the composite image SI, if any one of the operation information FI, the maintenance information MI, and the access information AC is associated with the object O in the workplace image FM, the icon is attached to this object O.

In addition, a shape of the icon is different depending on a type of information associated with the object O, and the access information AC is displayed with the icon at the object O associated with the access information AC.

This composite image SI can show the maintenance person which type of the operation information FI, the maintenance information, and the access information AC is associated to which object O, in a visually organized manner.

With reference to FIGS. 16 and 17 again, after generating the composite image SI as described above, the maintenance server 3 sends a screen 13 displaying the composite image SI and a chat box A4 (FIG. 27) to the maintenance terminal 21a that the maintenance person is using, who has the user ID used to generate the composite image SI, in Step S37 (Step S306).

For instance, the chat box A4 is displayed outside the area where the composite image SI is displayed.

It should be noted that Steps S31 to S37 and S41 to S44 described above are performed also in the case where the operator of the automatic warehouse system 1 accesses to the maintenance server 3 by using the operator terminal 17. In other words, the composite image SI is generated, and the screen 13 is outputted to the operator terminal 17. However, in this case, the access information AC is not associated with aby object O in the composite image SI. In other words, the operator who uses the operator terminal 17 can access to only the operation information FI and the maintenance information MI by referring to the composite image SI.

In addition, the maintenance server 3 associates the generated composite image SI with the identification information IN of the automatic warehouse system 1 indicated by the composite image SI. When the object O in the composite image SI is selected (clicked), this identification information IN is included in the selection result of the object O (described later) and is sent to the maintenance server 3.

The operations until the maintenance server 3 outputs the composite image SI, which is described above with reference to FIGS. 13 to 19, can be summarized as follows.

In this preferred embodiment, the maintenance server 3 generates the workplace image FM showing the automatic warehouse system 1 (Step S11), acquires the access information AC for accessing to the facility (Steps S12 and S21 to S23), associates the access information AC to access to the facility with the object O indicating the facility in the workplace image FM, generates the composite image SI (Steps S13 and S41 to S44), and outputs the composite image SI to the maintenance terminal 21a, 21b (Step S37).

The object O in the composite image SI generated as described above is associated with the access information AC to access to the corresponding facility. In this way, the user (maintenance person) of the maintenance terminal 21a, 21b can easily identify the facility to be accessed by referring to the composite image SI.

In addition, in this preferred embodiment, the maintenance server 3 acquires the operation information FI from the automatic warehouse system 1, and associates the operation information FI with the corresponding object O to generate the composite image SI. As described above, since the operation information FI includes the abnormality information indicating an abnormality that occurs in the facility of the automatic warehouse system 1, the maintenance person can easily and quickly access to the information about the abnormality that occurs in the facility.

In addition, in this preferred embodiment, the maintenance server 3 outputs the screen 13 that displays the chat box A4 together with the composite image SI. In addition, the maintenance server 3 disposes the chat box A4 together with the composite image SI generated by using the user ID of the operator.

In this way, using the chat box A4, the chat function can be shared between the maintenance person who uses the maintenance terminal 21a, 21b and the operator who uses the operator terminal 17.

As described above, when the composite image SI is generated and outputted, the maintenance terminal 21a, 21b displays the screen 13 on which the composite image SI and the chat box A4 are both displayed. When the screen 13 is displayed, it is started to provide the composite image SI on which the accessible facility can be easily identified. In addition to that, it is started to provide the operation information FI and the maintenance information MI stored in the maintenance server 3.

In other words, the maintenance person can easily and quickly access to the facility corresponding to the object O by referring to the composite image SI and by clicking the icon attached to the desired object O. In addition, the maintenance person can also access to the operation information and the maintenance information MI associated with the object O.

Figure 20:
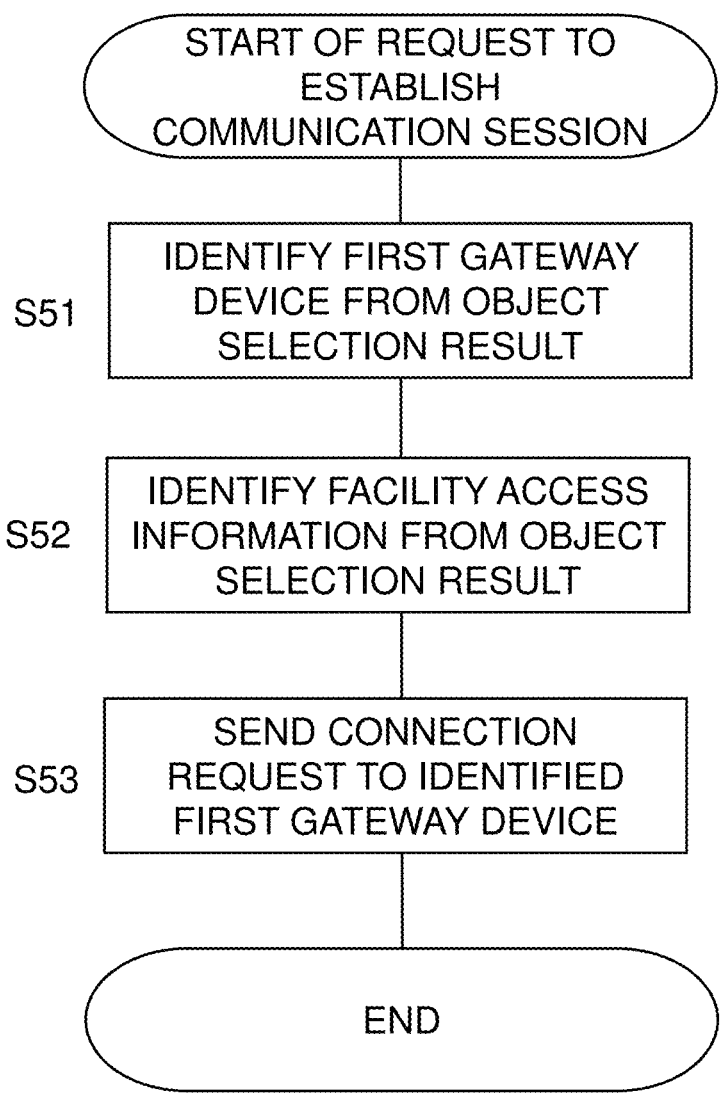
FIG. 20 is a flowchart illustrating a communication session establishing operation in the maintenance server.
Figure 21:
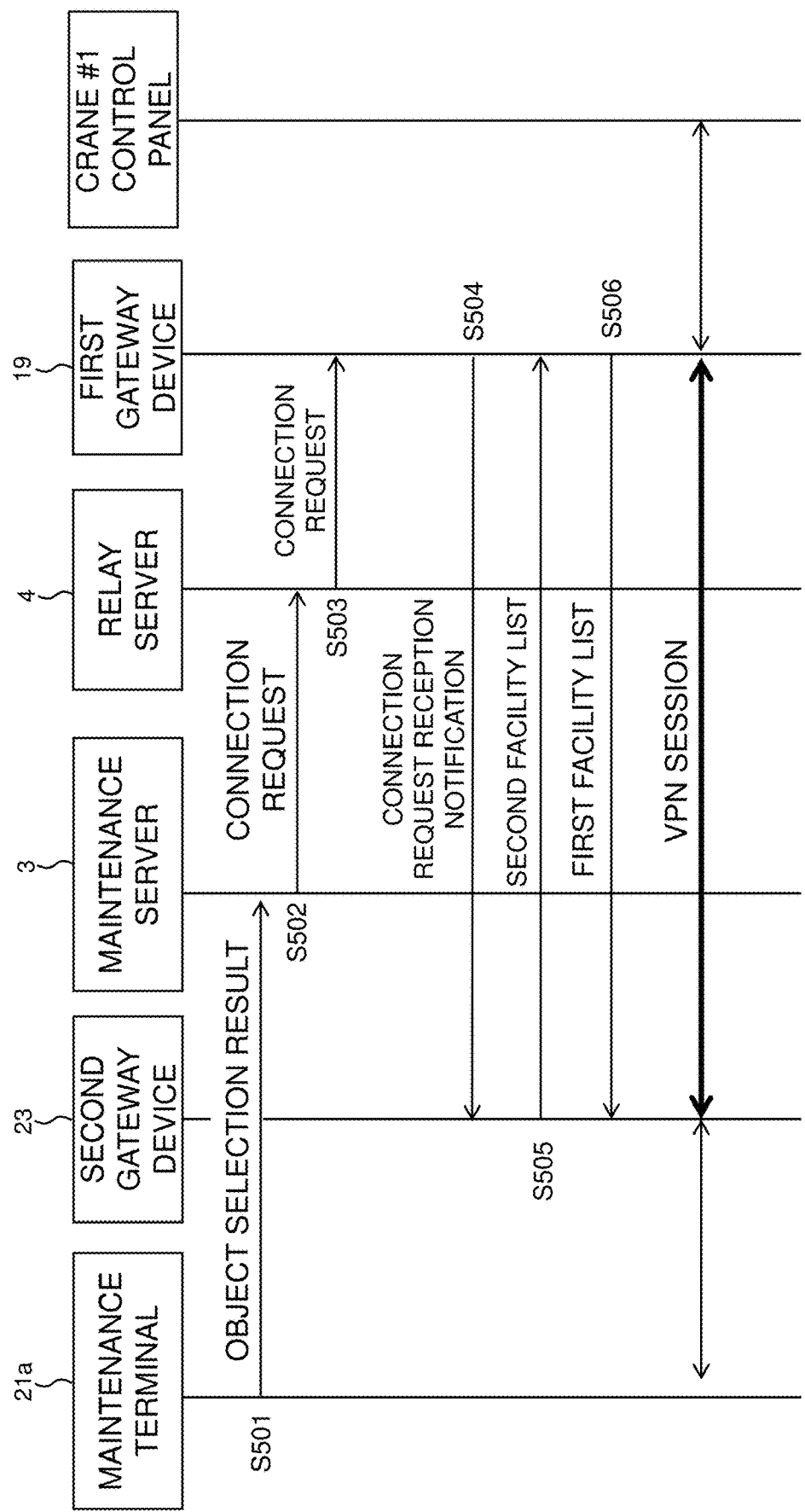
FIG. 21 is a diagram illustrating transmission and reception of information in the communication session establishing operation.

With reference to FIGS. 20 and 21, the operation until establishing a communication session between the maintenance terminal 21a, 21b and the facility corresponding to the object O identified in the composite image SI is described, hereinafter. FIG. 20 is a flowchart illustrating the communication session establishing operation of the maintenance server. FIG. 21 is a diagram illustrating transmission and reception of information in the communication session establishing operation.

The following description exemplifies establishment of a communication session between the maintenance terminal 21a that has logged in to the maintenance server 3 and the control panel of the stacker crane in the automatic warehouse 11 (the name of the facility is crane #1 control panel).

When the icon assigned with the access information AC is clicked in the composite image SI (FIG. 26A) in the screen 13 displayed on the maintenance terminal 21a ("Yes" in Step S3 of FIG. 12), information of the clicked icon is sent as the selection result of the object O from the maintenance terminal 21a to the maintenance server 3 (Step S501).

For instance, if the icon assigned with the access information AC "Ctrl001 192.168.0.111" is clicked, the maintenance terminal 21a sends the selection result of the object O to the maintenance server 3, which includes its IP address (within LAN), the identification number of the maintenance base 2 at which the maintenance terminal 21a exists, the access information AC, and the identification information IN associated with the composite image SI.

It should be noted that, if the icon that does not indicate that the access information AC is associated with the object O is clicked, the maintenance server 3 performs the operation associated with the icon.

When receiving the selection result of the object O from the maintenance terminal 21a, the maintenance server 3 identifies in Step S51 which first gateway device 19 is connected to the facility that the maintenance server 3 is trying to access.

Specifically, the maintenance server 3 identifies which first gateway device 19 has the identification information associated with the identification information IN of the received selection result in the gateway list GL. For instance, if the identification number "101" is received as the identification information IN, the maintenance server 3 refers to the gateway list GL of FIG. 10A and identifies the first gateway device 19 having the login ID "vpn001".

In addition, in Step S51, the maintenance server 3 also identifies the second gateway device 23 connected to the maintenance terminal 21a that has sent the selection result of the object O. For instance, if the identification number "201" is received, the maintenance server 3 refers to the gateway list GL of FIG. 10A and identifies the second gateway device 23 having the login ID "vpn002".

Next, the maintenance server 3 identifies the access information AC of the facility that the maintenance server 3 is trying to access, in Step S52. Specifically, the maintenance server 3 identifies the access information AC sent as the selection result of the object O, as the access information AC of the facility to be accessed.

In addition, in Step S52, the maintenance server 3 identifies the IP address of the maintenance terminal 21a from the address of the maintenance terminal 21a received as the selection result of the object O.

After that, in Step S53, the maintenance server 3 sends a connection request for the first gateway device 19 to the relay server 4, which includes the login ID (vpn001) of the first gateway device 19 identified in Steps S51 to S52 described above, the login ID (vpn002) of the identified second gateway device 23, the identified access information AC, and the IP address of the maintenance terminal 21a (Step S502).

By performing Steps S51 to S53 described above, the maintenance server 3 can send the instruction to establish a communication session between the maintenance terminal 21a and the facility in the automatic warehouse system 1 to the relay server 4, in the communication system 100.

After sending the instruction to establish a communication session between the maintenance terminal 21a and the facility in the automatic warehouse system 1, the relay server 4, the first gateway device 19, and the second gateway device 23 mainly perform the communication session establishing operation. With reference to FIG. 21, the establishing operation is described, hereinafter.

When receiving the connection request described above, the relay server 4 identifies the network address of the first gateway device 19 from the user ID "vpn001" as a destination of the connection request. In addition, it identifies the network address of the second gateway device 23 connected to the maintenance terminal 21a, from the user ID "vpn002".

After that, the identified network address of the second gateway device 23, the access information AC, and the IP address of the maintenance terminal 21a are sent to the specified first gateway device 19, as the connection request (Step S503).

When receiving the connection request described above, the first gateway device 19 determines whether or not to accept the connection request. If determining to accept the connection request, the first gateway device 19 sends a notification of accepting the connection request to the second gateway device 23 having the network address included in the received connection request (Step S504).

When receiving the notification described above, the second gateway device 23 sends the second facility list EL2 stored in it to the first gateway device 19 that has sent the notification described above (Step S505).

When receiving the second facility list EL2, the first gateway device 19 sends the first facility list EL1 stored in it to the second gateway device 23 that has sent the received facility list (Step S506).

In Steps S505 and S506 described above, after the first facility list EL1 and the second facility list EL2 stored in them are exchanged, the first gateway device 19 and the second gateway device 23 establish the VPN session between them.

When the VPN session is established between the first gateway device 19 and the second gateway device 23 as described above, the maintenance terminal 21a can access to the facility connected to the first gateway device 19, via the second gateway device 23 and the first gateway device 19.

In addition, when the VPN session is established between the first gateway device 19 and the second gateway device 23, the maintenance terminal 21a and each facility of the automatic warehouse system 1 can communicate to each other by using the IP addresses recorded in the address record portion R2 of the exchanged first facility list EL1 and the second facility list EL2.

For instance, after the VPN session is established, the facility of the automatic warehouse system 1 (the control panel having the name of crane #1 control panel) sends a notification that the VPN connection is ready to the IP address "172.28.0.2" of the maintenance terminal 21a, together with the IP address "192.168.0.111" of the facility.

When receiving this notification, the maintenance terminal 21a starts the application of maintaining the facility, for example. In this way, the user (maintenance person) of the maintenance terminal 21a can perform maintenance of the facility (control panel) using the application.

With the VPN session described above, the maintenance terminal 21a and the facility of the automatic warehouse system 1 can send and receive data from/to each other, via the first gateway device 19 and the second gateway device 23, using the IP address used within the LAN (the IP address such as "192.168.*.*" or "172.28.*.*" (* represents a wildcard)), such that the security is ensured.

The communication session establishing operation between the maintenance terminal 21a, 21b and the facility of the automatic warehouse system 1, which is described above with reference to FIGS. 20 and 21, can be summarized as follows.

As described above, when the specific object O in the composite image SI (the object O associated with the access information AC) is selected by the maintenance terminal 21a, 21b (Step S3, Step S501), the maintenance server 3 establishes a communication session between the facility corresponding to the object O and the maintenance terminal 21a, 21b, by using the access information AC associated with the selected object O (Steps S51 to S53, Step S502).

In this way, the user (maintenance person) of the maintenance terminal 21a, 21b can easily identify the facility to be accessed by referring to the composite image SI, and can quickly access to the specified facility.

Figure 27:
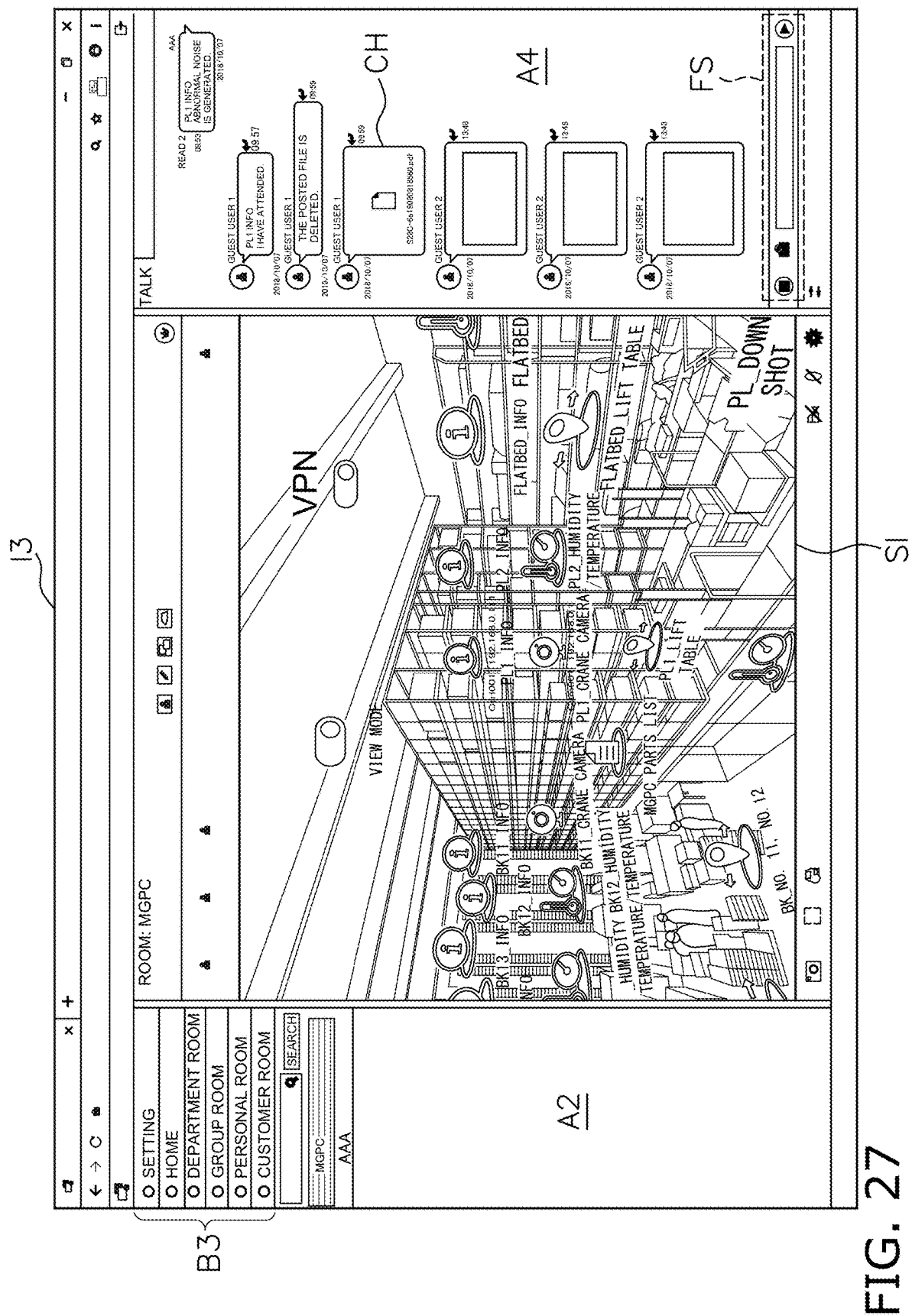
FIG. 27 is a diagram illustrating an example of a screen simultaneously displaying the composite image and the chat box.

After the screen 13 as illustrated in FIG. 27 described above is displayed, the maintenance person can chat using the chat box A4 on the maintenance terminal 21a, 21b. In addition, various functions can be performed using the composite image SI.

For instance, a new composite image SI can be generated by associating chat content in the chat box A4 with the composite image SI. In addition, by clicking a chat content in the chat box A4, it is possible to "jump" (access) to the position (object O) in the composite image SI, which is associated with the chat content.

Further, it is possible to newly generate operation information FI and maintenance information MI, or edit the existing operation information FI and maintenance information MI, to associate them with the composite image SI.

Not only when the operation information FI and the maintenance information MI are updated, but also when a connection state of the facility in the automatic warehouse system 1 is changed, or when the facility in the automatic warehouse system 1 is changed, or when the number of facilities is changed, the maintenance server 3 can reflect the change on the composite image SI.

Figure 22:
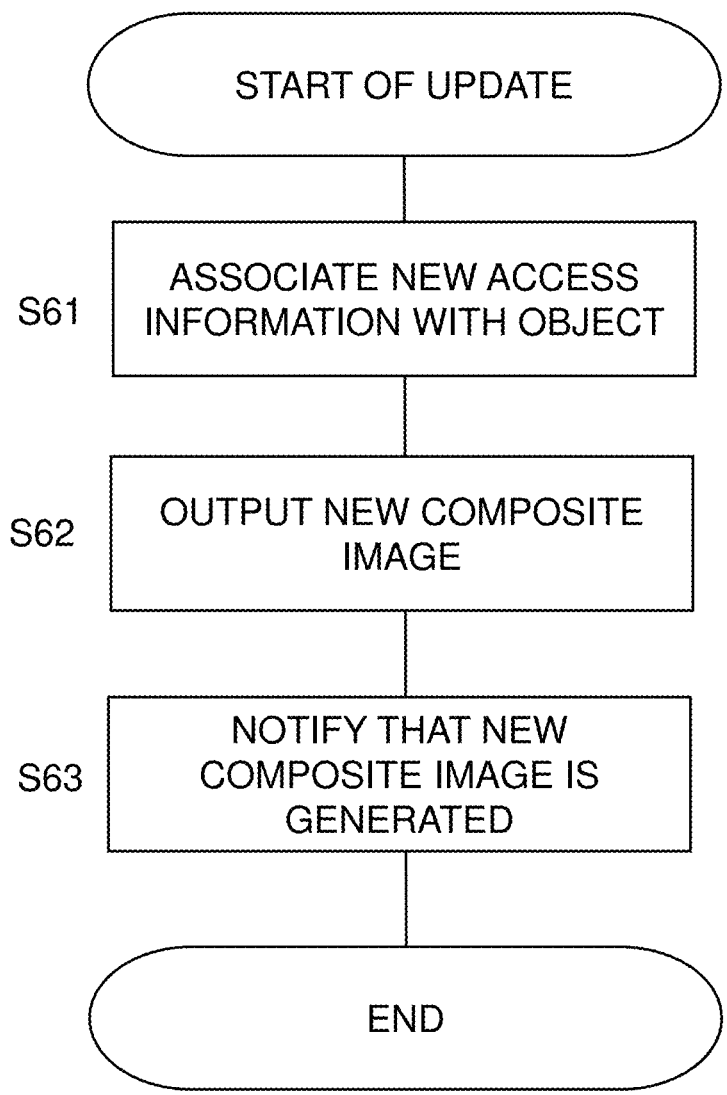
FIG. 22 is a flowchart illustrating an operation in the maintenance server when a facility is changed.
Figure 23:
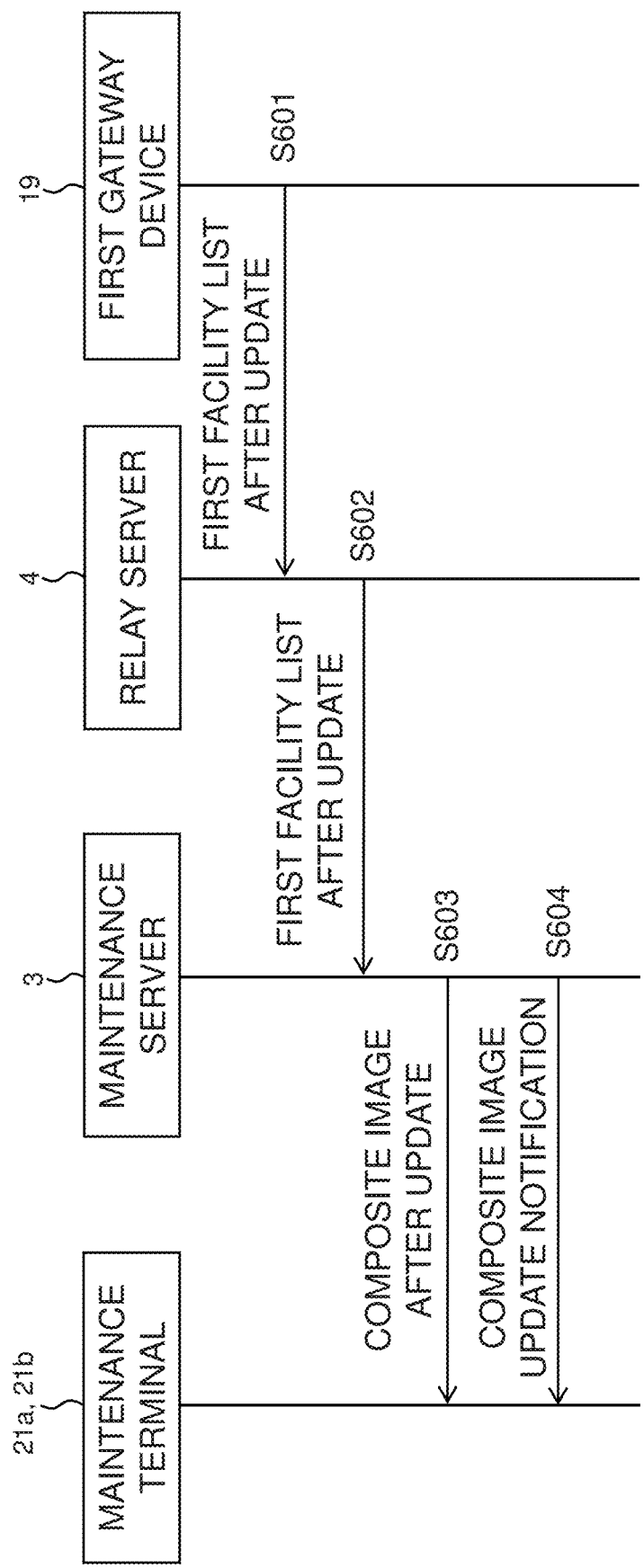
FIG. 23 is a diagram illustrating transmission and reception of information when a facility is changed.

With reference to FIGS. 22 and 23, an operation of the communication system 100 when the facility is changed is described, hereinafter. FIG. 22 is a flowchart illustrating an operation of the maintenance server when the facility is changed. FIG. 23 is a diagram illustrating transmission and reception of information when the facility is changed.

For instance, when a new gateway device is added to the automatic warehouse system 1, and/or when the facility is removed and/or added to the existing automatic warehouse system 1, the first gateway device 19 of the automatic warehouse system 1, in which the facility is changed, generates (updates) the first facility list EL1 corresponding to the change in the new facility. The first gateway device 19 sends the new first facility list EL1 to the relay server 4 (Step S601).

When receiving the new first facility list EL1, the relay server 4 sends the same to the maintenance server 3 (Step S602). In this case, the relay server 4 sends the identification information IN (such as the login ID) of the first gateway device 19 that has sent the new first facility list EL1, together with the new first facility list EL1.

When receiving the new first facility list EL1, the maintenance server 3 updates the composite image SI to correspond to the new first facility list EL1. The update of the composite image SI is performed as follows.

First, in Step S61, the maintenance server 3 performs new association between each access information AC in the new first facility list EL1 and the object O in the composite image SI.

Specifically, the maintenance server 3 first determines which composite image generation information GI should be changed based on the identification information IN sent with the new first facility list EL1. Next, the corresponding first facility list EL1 in the composite image generation information GI is replaced by the new first facility list EL1. Further, the maintenance server 3 performs the association between the object O and the new access information AC included in the new first facility list EL1, to generate new association information AI.

It should be noted that the association between the object O and the new access information AC in Step S61 described above can be done by performing Steps S11 to S13 (FIG. 13) and Steps S21 to S23 (FIG. 14) described above, based on the new first facility list EL1. Therefore, detailed description thereof is omitted.

After performing the new association between the object O and the access information AC, the maintenance server 3 generates the new composite image SI based on the new composite image generation information GI, and outputs the same to the maintenance terminal 21a, 21b in Step S62 (Step S603).

It should be noted that the generation and output of the new composite image SI in Step S52 described above can be done by performing Steps S31 to S37 (FIG. 16) and Steps S41 to S44 (FIG. 19) on the basis of the new association. Therefore, detailed description thereof is omitted.

In this way, if the facility of the automatic warehouse system 1 is changed after the composite image SI is generated, the new composite image SI is generated and outputted based on the new access information corresponding to the change in the facility. Thus, when the facility is changed in the automatic warehouse system 1, the latest composite image SI in which the change is reflected can be provided to the maintenance terminal 21a, 21b.

After the new composite image SI is generated as described above, the maintenance server 3 notifies the maintenance terminal 21a, 21b that the composite image SI is updated, in Step S63.

Figure 24:
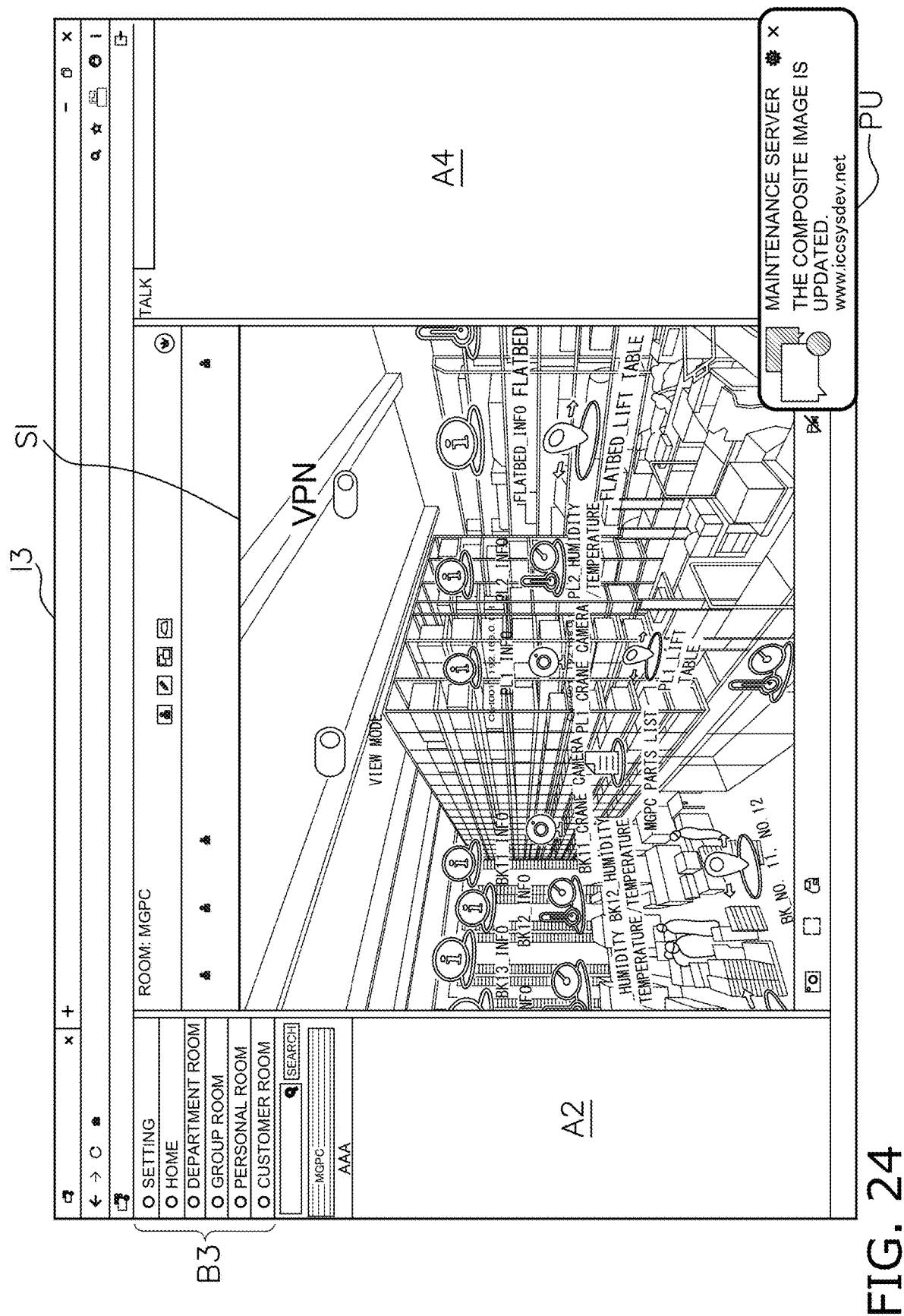
FIG. 24 is a diagram illustrating an example of notification that the composite image is updated.

The notification described above is, for example, an instruction to display a popup window PU displaying "The composite image is updated." on the screen 13, in a predetermined area (the lower area in the example of FIG. 24) of the chat box A4, as illustrated in FIG. 24. FIG. 24 is a diagram illustrating an example of the notification that the composite image is updated. Other than that, the notification described above may be an instruction to cause the maintenance terminal 21a, 21b to generate a predetermined sound.

Alternatively, it may be possible to post a message "The composite image is updated" to the chat box A4. In addition, it may be possible that this message includes a link to the updated data, so that the updated data in the composite image SI can be accessed from the link in the message.

In this way, since, when the new composite image SI is generated, this notification is sent from the maintenance server 3 to the maintenance terminal 21a, 21b, the maintenance person who uses the maintenance terminal 21a, 21b can easily recognize that the new composite image SI (latest composite image SI) is generated, i.e., that the composite image SI is updated. In addition, the maintenance person can recognize that the facility is changed in the automatic warehouse system 1 by recognizing that the composite image SI is updated.

It should be noted that if the maintenance person using the maintenance terminal 21a, 21b is chatting with the operator using the operator terminal 17, the popup described above is displayed also in the chat box A4 on the operator terminal 17. In this way, the operator of the automatic warehouse system 1 is also notified that the facility is changed in the automatic warehouse system 1, together with the update of the composite image SI.

Hereinafter, a structure of the screen displayed on the operator terminal 17 and the maintenance terminal 21a, 21b is briefly described. It should be noted that the screen shown in the following description is an example, and structure and/or appearance of the display screen can be appropriately modified.

Figure 25:
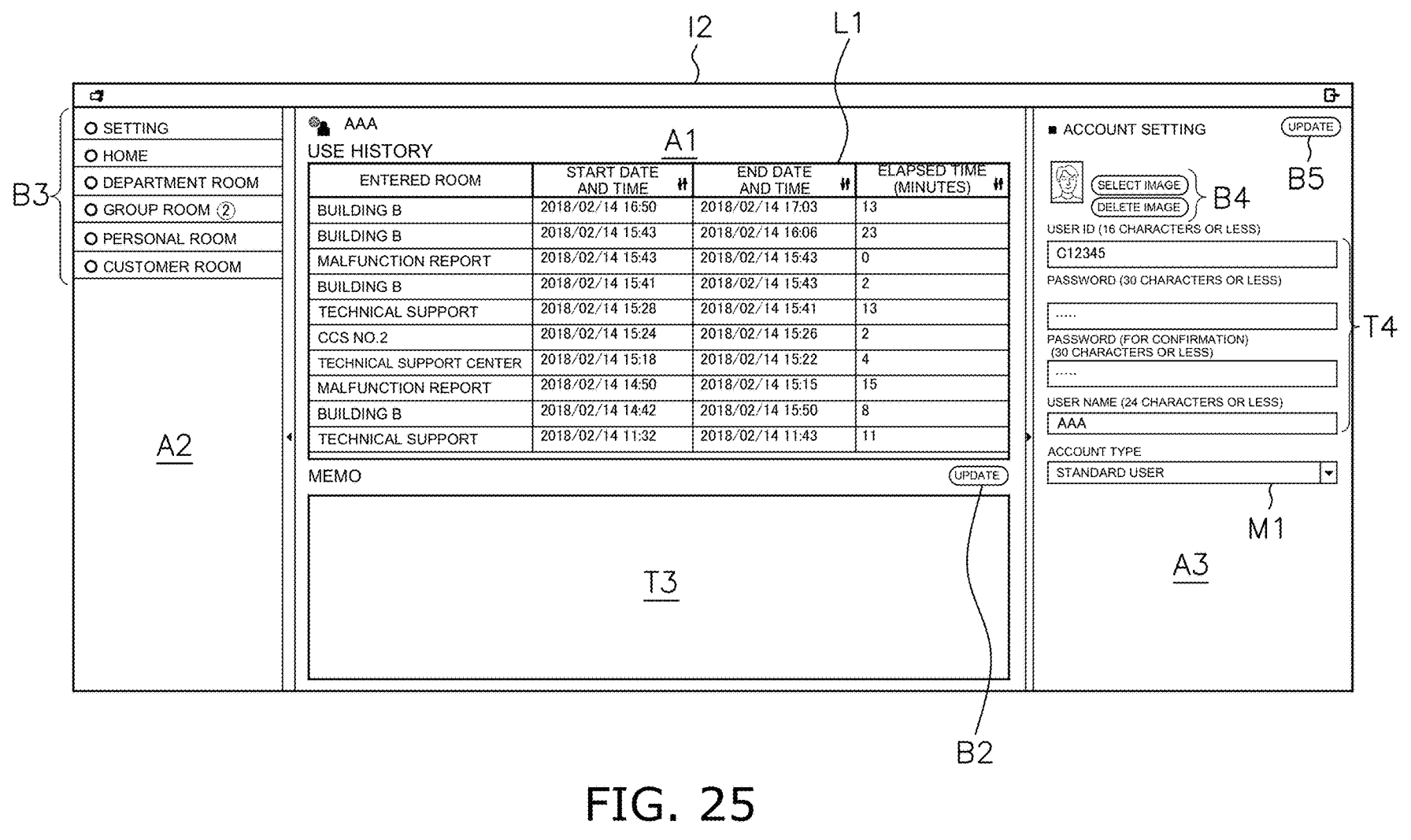

First, with reference to FIG. 25, a structure of the initial screen 12 displayed on the operator terminal 17 and the maintenance terminal 21a, 21b after logging in to the maintenance server 3 is described. FIG. 25 is a diagram illustrating an example of the initial screen. The initial screen 12 has a use history display box A1. The use history display box A1 displays a use history list L1 to display a list of the use history, an update button B2 for updating the use history, and a memo box T3 for displaying memos.

The initial screen 12 has a room selection box A2. The room selection box A2 displays selection buttons B3 to select a chat room to enter. When one of the selection buttons B3 is pressed, it is requested to enter the chat room of the selected button.

It should be noted that a button of a room that the user cannot enter or exit is not displayed or is invalid (cannot be selected).

The initial screen 12 has a user information change box A3. The user information change box A3 displays an information edit box T4 to edit user information (user ID, password, user name to be associated to the user ID), an image change button B4 to change a user image (avatar), a type change box M1 to change an account type, and an update button B5 to update user information when pressed.

Figure 26A:
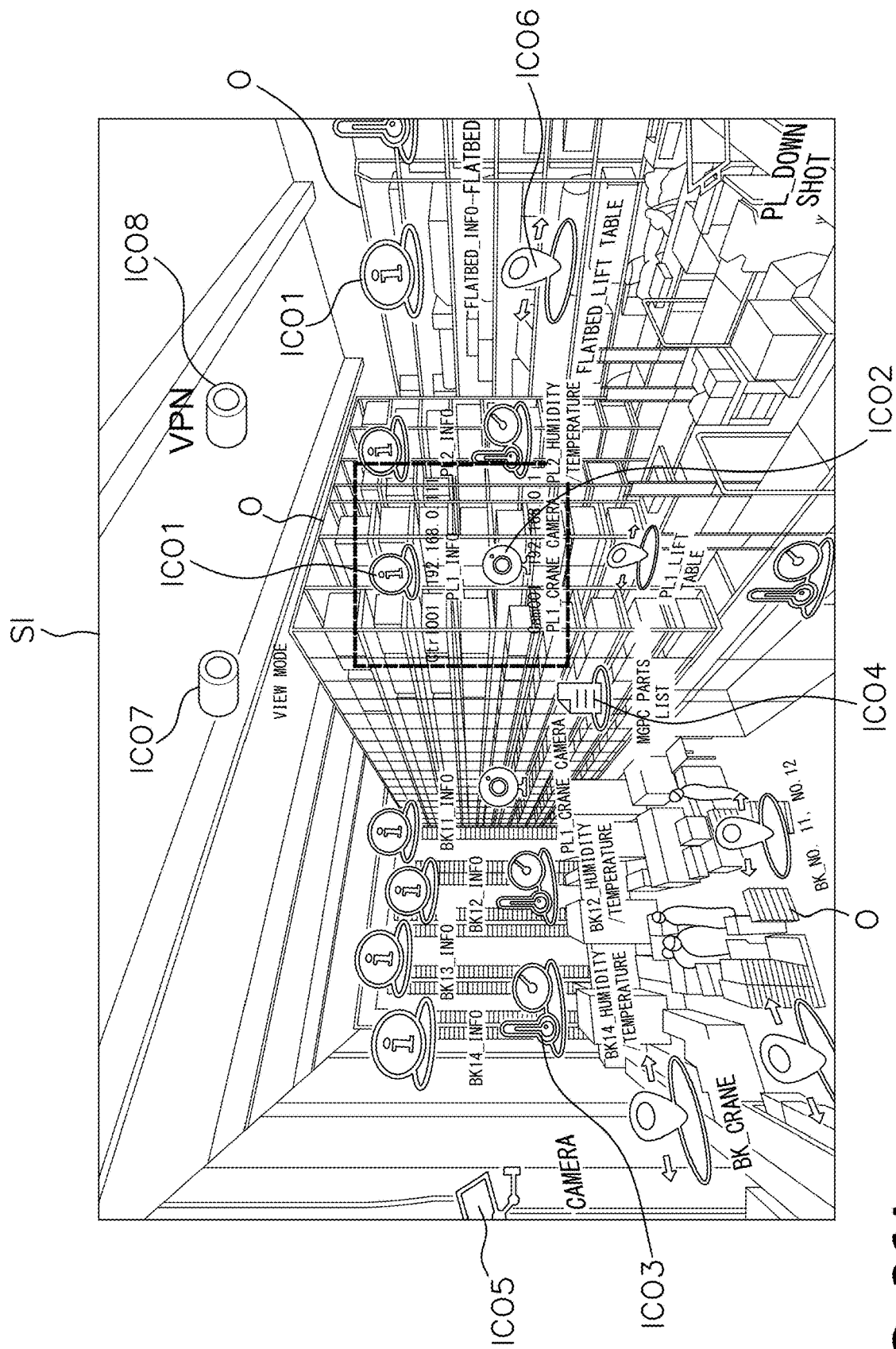
FIG. 26A is a diagram illustrating an example of the composite image.
Figure 26B:
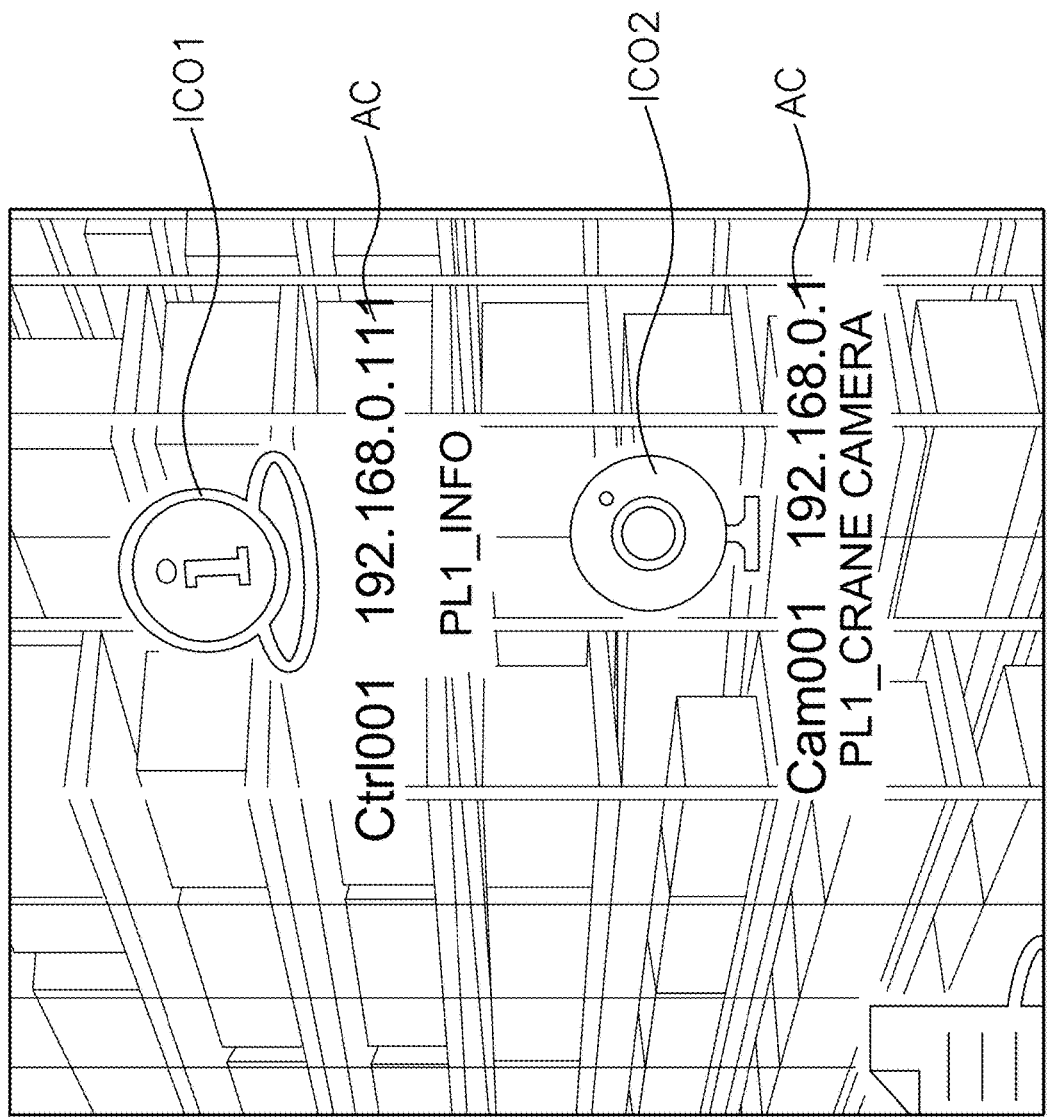
FIG. 26B is an enlarged diagram of a portion of the composite image.

Next, with reference to FIGS. 26A and 26B, a structure of the composite image SI is described. FIG. 26A is a diagram illustrating an example of the composite image. FIG. 26B is an enlarged diagram of a portion of the composite image. The composite image SI displays a plurality of objects O indicating facilities in the automatic warehouse system 1. Specifically, a plurality of types of the automatic warehouses 11 included in the automatic warehouse system 1 are displayed as the objects O.

In addition, in the composite image SI, the icon is attached to each of the objects O. In the example of the composite image SI illustrated in FIG. 26A, eight types of icons (ICO1 to ICO8) are attached. It should be noted that types of the icons displayed in the composite image SI can be arbitrarily determined depending on a type of the information associated with the facility, or the like.

The first icon ICO1 has a shape of circled character "i". The first icon ICO1 shows that the facility at which this icon is attached is associated with the operation information FI and/or the maintenance information MI that are various information about this facility (such as a manual). In addition, a character string "* INFO" ("*" is a designation of facility, the same is true below) is attached below the first icon ICO1, so that the object at which the first icon ICO1 is attached is specifically indicated.

The second icon ICO2 has a shape of a small camera. The second icon ICO2 shows that the facility at which this icon is attached is associated with the operation information FI that is image data acquired by the camera CA installed at this facility. In addition, a character string "*** camera" is attached below the second icon ICO2, so that the object at which the second icon ICO2 is attached is specifically indicated.

The third icon ICO3 has a shape of a thermometer and a hygrometer. The third icon ICO3 shows that the facility at which this icon is attached is associated with the operation information FI that is data (temperature, humidity) acquired by the sensor SE installed at this facility. In addition, a character string "*** humidity/temperature" is attached below the third icon ICO3, so that the object at which the third icon ICO3 is disposed is specifically indicated.

The fourth icon ICO4 has a shape of a document. The fourth icon ICO4 shows that the facility at which this icon is attached is associated with the maintenance information MI that is the parts list of this facility. In addition, a character string "*** parts list" is attached below the fourth icon ICO4, so that the object at which the fourth icon ICO4 is attached is specifically indicated.

The fifth icon ICO5 has a shape of a large camera. The fifth icon ICO5 shows that the large camera at which this icon is attached is associated with the operation information FI that is image data acquired by the large camera with this icon. In addition, a character string "camera" is attached below the fifth icon ICO5, so as to indicate that the fifth icon ICO5 is attached at the object of the large camera.

The sixth icon ICO6 has a shape of an inverted triangle with an arrow beside it. The sixth icon ICO6 is attached at a predetermined position in the workplace image FM (the composite image SI), and shows that, when this icon is clicked, view field of the composite image SI is moved in the direction of the icon.

When the sixth icon ICO6 is pressed or operated, the center of the view field of the composite image SI becomes the position of the selected sixth icon ICO6, and the direction of the view field becomes the front direction of the sixth icon ICO6. In this way, in the composite image SI, a virtual reality as if the user moved in the automatic warehouse system 1 can be performed.

The seventh icon ICO7 is attached at a predetermined position in the workplace image FM (the composite image SI) (in the upper portion in the composite image SI in the example of FIG. 26A), and has a shape of a switch. In addition, a character string "View Mode" is attached below it. The seventh icon ICO7 has a function to switch between display and non-display of the first icon ICO1 to the sixth icon ICO6 when being clicked.

The eighth icon ICO8 is attached at a predetermined position in the workplace image FM (composite image SI) (at the upper portion in the composite image SI in the example of FIG. 26A), and has a shape like a switch. In addition, a character string "VPN" is attached above it. The eighth icon ICO8 has a function to switch between display and non-display of the access information AC in the composite image SI when being clicked.

As illustrated in FIG. 26B (an enlarged diagram of the part enclosed by a dotted line in FIG. 26A), the access information AC is displayed in some icons included in the composite image SI. In the example illustrated in FIG. 26B, "Ctrl 001 192.168.0.111", which is the sub ID of the facility (the control panel of the stacker crane) and the IP address, is displayed as the access information AC between the display "PL1_INFO" and the first icon ICO1. In addition, "Cam001 192.168.0.1", which is the sub ID of the facility (camera CA) and the IP address, is displayed as the access information AC between the display "PL1_crane camera" and the second icon ICO2.

With reference to FIG. 27, a structure of the screen 13 on which the composite image SI and the chat box A4 are simultaneously displayed is described, hereinafter. FIG. 27 is a diagram illustrating an example of the screen on which the composite image and the chat box are simultaneously displayed.

As illustrated in FIG. 27, in the screen 13, the room selection box A2 and the chat box A4 described above are displayed outside the area in which the composite image SI is displayed. In the example illustrated in FIG. 27, the room selection box A2 is displayed on the left side of the composite image SI, and the chat box A4 is displayed on the right side of the same.

In the chat box A4, chat contents of the current chat performed at predetermined timings are shown as balloons CH in time series. In addition, a file selection box FS is disposed in the chat box A4. In the file selection box FS, the file stored in the operator terminal 17, the maintenance terminal 21a, or the like is selected, and is attached to the chat content (balloon CH).

The file attached to the chat content in this way can be dragged to the composite image SI and associated as the operation information FI or the maintenance information MI with a predetermined position or an object O in the composite image SI.

For instance, the file associated from the chat content can be associated as the operation information FI when the above-mentioned operation is performed on the operator terminal 17, while it can be associated as the maintenance information MI when the above-mentioned operation is performed on the maintenance terminal 21a, 21b.

Figure 28:
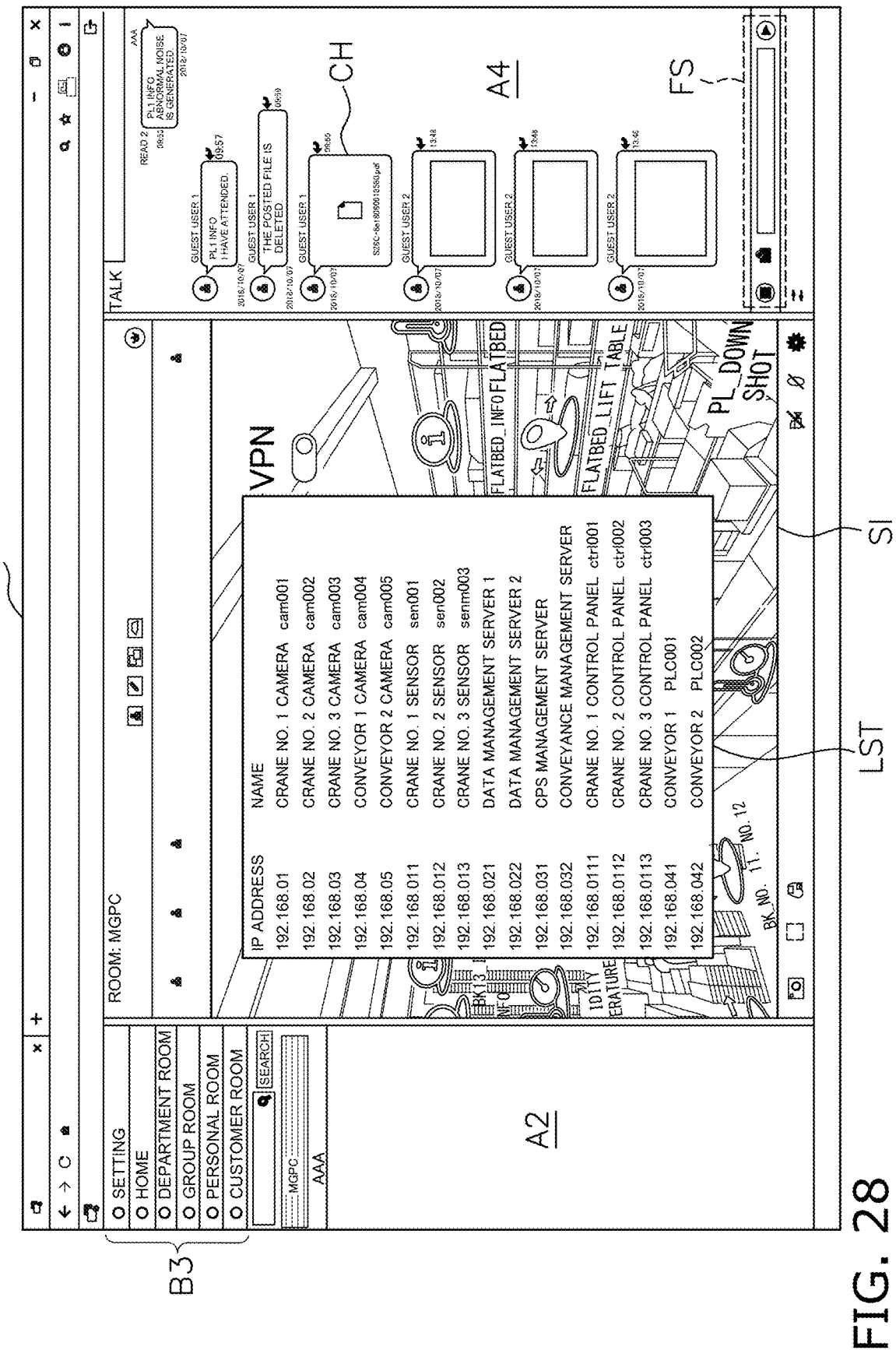
FIG. 28 is a diagram illustrating an example of a display screen displaying the access information as a character string list.

In addition, as illustrated in FIG. 28, by switching the display in the screen 13, the access information AC associated with the object O in the composite image SI can be displayed as a list of character strings. FIG. 28 is a diagram illustrating an example of a display screen displaying the access information as a list LST of character strings.

OTHER PREFERRED EMBODIMENTS

Although preferred embodiments of the present invention is described above, the present invention is not limited to these preferred embodiments but can be variously modified within the scope of the present invention without deviating from the spirit thereof. In particular, a plurality of preferred embodiments and variations described in this specification can be arbitrarily combined as necessary.

The order of the processes in the flowchart described above, and the operations of the steps can be modified within the scope of the present invention without deviating from the spirit thereof.

It may be possible that the composite image SI does not have the icon indicating that the object O is associated with the access information AC. In this case, for example, when a cursor (e.g., a mouse cursor) is placed on the composite image SI, if the access information AC is associated with the object O indicated by the cursor, the access information AC of the object O may be displayed. In addition, it may be possible that the access information AC is not displayed in association with the object O, but a message inquiring whether or not to access the facility corresponding to the object O is displayed, for example. In other words, it is sufficient that the object O is associated with the access information AC in the composite image SI, without regard to the specific display thereof.

Instead of the user ID and the password, biological information of the operator and the maintenance person (such as fingerprints, blood vessel (vein) patterns, iris patterns, or facial patterns) can be used for the user authentication.

Further, for example, identification information of the operator terminal 17 and the maintenance terminal 21a, 21b (such as MAC addresses or IP addresses) can be used for the user authentication. In this case, the access permission can be set for each operator terminal 17, each maintenance terminal 21a, 21b, each LAN group, each automatic warehouse system 1, each maintenance base 2, or the like.

The communication system 100 described above can be used not only in the case where information is shared between the automatic warehouse system 1 and the maintenance base 2 to maintain facilities in the automatic warehouse system 1, but also in other systems in which information is shared between sites apart from each other.

The chat box A4 may be displayed in a state overlapping a portion of the composite image SI. In this case, the chat box A4 and/or the composite image SI may be movable within the screen.

Preferred embodiment of the present invention can be widely applied to communication systems to remotely maintain a facility in a workplace.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A maintenance method executed by a maintenance server to maintain a facility at a workplace, using a maintenance terminal installed at a maintenance base outside the workplace, the method comprising:
   generating a workplace image showing the workplace;
   acquiring access information to access to the facility;
   generating a composite image by associating an object indicating the facility in the workplace image with the access information to access to the facility;
   outputting the composite image to the maintenance terminal;
   receiving a selection of the object in the composite image using the maintenance terminal; and
   establishing a communication session between a gateway connected to the facility corresponding to the selected object and a gateway connected to the maintenance terminal, by using the access information associated with the selected object.

2. The maintenance method according to claim 1, wherein a plurality of the workplaces exist; and
   the workplace image, the access information, and the composite image are generated for each of the plurality of workplaces.

3. The maintenance method according to claim 1, further comprising:
   receiving abnormality information indicating an abnormality that occurs in the facility, from the facility; and
   generating the composite image by associating the abnormality information with the object corresponding to the facility in which the abnormality occurs.

4. The maintenance method according to claim 1, further comprising:
   generating a new composite image using new access information corresponding to a change in the facility, if the facility at the workplace is changed after the composite image is generated; and
   outputting the new composite image to the maintenance terminal.

5. The maintenance method according to claim 4, further comprising a step of notifying the maintenance terminal that the composite image is updated when the new composite image is generated.

6. The maintenance method according to claim 5, further comprising displaying a chat box together with the composite image, the chat box providing a chat function between a maintenance person using the maintenance terminal and an operator using an operator terminal installed at the workplace; wherein a notification that the composite image is updated is displayed in the chat box.

7. A maintenance server to maintain a facility at a workplace by using a maintenance terminal installed at a maintenance base outside the workplace, the maintenance server comprising a controller configured or programmed to perform:
   generating a workplace image showing the workplace;
   acquiring access information to access to the facility;
   generating a composite image by associating an object indicating the facility in the workplace image with the access information to access to the facility;
   outputting the composite image to the maintenance terminal;
   receiving a selection of the object in the composite image using the maintenance terminal; and
   establishing a communication session between a gateway connected to the facility corresponding to the selected object and a gateway connected to the maintenance terminal, by using the access information associated with the selected object.

8. The maintenance server according to claim 7, wherein a plurality of the workplaces exist; and
   the controller is configured or programmed to generate the workplace image, the access information, and the composite image for each of the plurality of workplaces.

9. The maintenance server according to claim 7, wherein the controller is configured or programmed to receive abnormality information indicating an abnormality that occurs in the facility, from the facility, and generate the composite image by associating the abnormality information with the object corresponding to the facility in which the abnormality occurs.

10. The maintenance server according to claim 7, wherein the controller is configured or programmed to generate a new composite image using new access information corresponding to a change in the facility, and output the new composite image to the maintenance terminal, if the facility at the workplace is changed after the composite image is generated.

11. The maintenance server according to claim 10, wherein when generating the new composite image, the controller is configured or programmed to notify the maintenance terminal that the composite image is updated.

12. The maintenance server according to claim 11, wherein the controller is configured or programmed to display a chat box together with the composite image, the chat box providing a chat function between a maintenance person using the maintenance terminal and an operator using an operator terminal disposed at the workplace, and display in the chat box a notification that the composite image is updated.

13. A non-transitory computer readable medium that stores a program that causes a computer to execute a maintenance method, the maintenance method comprising:
   generating a workplace image showing the workplace;
   acquiring access information to access to the facility;
   generating a composite image by associating an object indicating the facility in the workplace image with the access information to access to the facility;
   outputting the composite image to the maintenance terminal;
   receiving a selection of the object in the composite image using the maintenance terminal;
   establishing a communication session between a gateway connected to the facility corresponding to the selected object and a gateway connected to the maintenance terminal, by using the access information associated with the selected object.

\* \* \* \* \*